United States Patent
Sasaki

(10) Patent No.: US 11,084,274 B2
(45) Date of Patent: Aug. 10, 2021

(54) THREE-DIMENSIONAL SHAPING APPARATUS, METHOD FOR CONTROLLING THREE-DIMENSIONAL SHAPING APPARATUS, AND RECORDING MEDIUM

(71) Applicant: Takafumi Sasaki, Kanagawa (JP)

(72) Inventor: Takafumi Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 829 days.

(21) Appl. No.: 15/375,738

(22) Filed: Dec. 12, 2016

(65) Prior Publication Data

US 2017/0173887 A1    Jun. 22, 2017

(30) Foreign Application Priority Data

Dec. 18, 2015    (JP) .............................. JP2015-247794

(51) Int. Cl.
*B29C 67/00*    (2017.01)
*B33Y 50/02*    (2015.01)
(Continued)

(52) U.S. Cl.
CPC ............ *B33Y 50/02* (2014.12); *B29C 64/165* (2017.08); *B33Y 30/00* (2014.12);
(Continued)

(58) Field of Classification Search
CPC ......... B33Y 10/00; B33Y 30/00; B33Y 50/00; B33Y 50/02; B29C 64/165; B29K 2105/251

See application file for complete search history.

(56) References Cited

U.S. PATENT DOCUMENTS 7,604,768 B2    10/2009   Kritchman
7,628,857 B2    12/2009   Kritchman et al.
(Continued)

FOREIGN PATENT DOCUMENTS

JP           5471939      2/2014
JP        2016-155367    9/2016
(Continued)

OTHER PUBLICATIONS

Japanese Office Action dated Oct. 29, 2019 for Japanese Application No. 2015-247794.
(Continued)

*Primary Examiner* — Ryan M Ochylski
(74) *Attorney, Agent, or Firm* — Harness, Dickey & Pierce, P.L.C.

(57) ABSTRACT

A three-dimensional shaping apparatus includes: a supplying unit configured to supply powder to a storage unit to form a layer of the powder; a discharging unit configured to discharge shaping liquid to solidify the powder onto the powder; and a controlling unit configured to generate a control signal for controlling the supplying unit and the discharging unit based on shaping data indicating a shape of a three-dimensional shaped object. The controlling unit is configured to generate the control signal for laminating at least one sacrificial layer separable from at least one shaping layer corresponding to the three-dimensional shaped object in such a position that the at least one sacrificial layer is under the at least one shaping layer, based on the shaping data and powder information stored in advance and indicating change in thickness of a layer of the powder caused by permeation of the shaping liquid.

19 Claims, 19 Drawing Sheets

(51) Int. Cl.
- *B29C 64/165* (2017.01)
- *B33Y 30/00* (2015.01)
- *B33Y 50/00* (2015.01)
- *B33Y 10/00* (2015.01)
- *B29K 105/00* (2006.01)

(52) U.S. Cl.
CPC .......... *B29K 2105/0058* (2013.01); *B29K 2105/251* (2013.01); *B33Y 10/00* (2014.12); *B33Y 50/00* (2014.12)

(56) References Cited

U.S. PATENT DOCUMENTS

| | | |
|---|---|---|
| 7,658,976 B2 | 2/2010 | Kritchman |
| 7,958,841 B2 | 6/2011 | Kritchman et al. |
| 8,209,044 B2 | 6/2012 | Inoue |
| 8,636,494 B2 | 1/2014 | Gothait et al. |
| 9,017,589 B2 | 4/2015 | Kritchman et al. |
| 2002/0062909 A1 | 5/2002 | Jang et al. |
| 2002/0093115 A1 | 7/2002 | Jang et al. |
| 2006/0054039 A1 | 3/2006 | Kritchman et al. |
| 2008/0110395 A1 | 5/2008 | Kritchman et al. |
| 2008/0118655 A1 | 5/2008 | Kritchman |
| 2008/0121130 A1 | 5/2008 | Kritchman |
| 2008/0121172 A1 | 5/2008 | Kritchman et al. |
| 2008/0124464 A1 | 5/2008 | Kritchman et al. |
| 2008/0124475 A1 | 5/2008 | Kritchman |
| 2008/0166480 A1 | 7/2008 | Kritchman et al. |
| 2009/0025638 A1 | 1/2009 | Inoue |
| 2010/0042241 A1 | 2/2010 | Inoue |
| 2011/0241240 A1 | 10/2011 | Gothait et al. |
| 2013/0307175 A1* | 11/2013 | Tang .............. B29C 67/242 264/42 |
| 2014/0175706 A1 | 6/2014 | Kritchman |
| 2015/0224709 A1 | 8/2015 | Napadensky |
| 2016/0243805 A1* | 8/2016 | Satoh ............. B29C 64/153 |
| 2016/0325506 A1 | 11/2016 | Puigardeu Aramendia et al. |
| 2017/0021569 A1 | 1/2017 | Puigardeu Aramendia et al. |

FOREIGN PATENT DOCUMENTS

| | | |
|---|---|---|
| WO | WO-2008/044693 A1 | 4/2008 |
| WO | WO-2015/108554 A1 | 7/2015 |
| WO | WO-2015/152875 A1 | 10/2015 |

OTHER PUBLICATIONS

Extended European Search Report dated Jul. 12, 2017 issued in corresponding European Application No. 16204062.0.
U.S. Appl. No. 15/276,881, filed Sep. 26, 2016.

* cited by examiner

| | |
|---|---|
| m (TOTAL NUMBER OF LAMINATED LAYERS) | 10 |
| t (DESIGNED THICKNESS OF SINGLE LAYER) μm | 100 |
| DESIGNED THICKNESS=mt μm | 1000 |
| ti (THICKNESS AFTER DISCHARGING SHAPING LIQUID) μm | 66.6 |
| k=ti/t | 0.666 |

| n | tn | SECOND TERM OF tr |
|---|---|---|
| 1 | 67 | 599 |
| 2 | 89 | 711 |
| 3 | 96 | 674 |
| 4 | 99 | 593 |
| 5 | 100 | 498 |
| 6 | 100 | 399 |
| 7 | 100 | 300 |
| 8 | 100 | 200 |
| 9 | 100 | 100 |
| 10 | 100 | 0 |

| FIRST TERM OF tr | SUM OF SECOND TERMS OF tr | tr [μm] | DIFFERENCE FROM DESIGNED VALUE [μm] |
|---|---|---|---|
| 5500 | 4074 | 950 | 50 |

| m (TOTAL NUMBER OF LAMINATED LAYERS) | 15 |
|---|---|
| t (DESIGNED THICKNESS OF SINGLE LAYER) μm | 100 |
| DESIGNED THICKNESS=mt μm | 1500 |
| ti (THICKNESS AFTER DISCHARGING SHAPING LIQUID) μm | 35.7 |
| k=ti/t | 0.357 |

| n | tn | SECOND TERM OF tr |
|---|---|---|
| 1 | 36 | 500 |
| 2 | 59 | 763 |
| 3 | 73 | 881 |
| 4 | 83 | 912 |
| 5 | 89 | 890 |
| 6 | 93 | 837 |
| 7 | 95 | 764 |
| 8 | 97 | 680 |
| 9 | 98 | 589 |
| 10 | 99 | 494 |
| 11 | 99 | 397 |
| 12 | 100 | 299 |
| 13 | 100 | 199 |
| 14 | 100 | 100 |
| 15 | 100 | 0 |

| FIRST TERM OF tr | SUM OF SECOND TERMS OF tr | tr [μm] | DIFFERENCE FROM DESIGNED VALUE [μm] |
|---|---|---|---|
| 12000 | 8304 | 1320 | 180 |

THREE-DIMENSIONAL SHAPING APPARATUS, METHOD FOR CONTROLLING THREE-DIMENSIONAL SHAPING APPARATUS, AND RECORDING MEDIUM

CROSS-REFERENCE TO RELATED APPLICATIONS

The present application claims priority under 35 U.S.C. § 119 to Japanese Patent Application No. 2015-247794, filed Dec. 18, 2015. The contents of which are incorporated herein by reference in their entirety.

BACKGROUND OF THE INVENTION

1. Field of the Invention

The present invention relates to a three-dimensional shaping apparatus, a method for controlling a three-dimensional shaping apparatus, and a recording medium.

2. Description of the Related Art

As a method for manufacturing a three-dimensional shaped object, a powder lamination shaping method of a binder-jet type is known. According to this shaping method, a step of supplying material powder to the inside of a container in a predetermined amount at a time so as to form a powder layer and a step of discharging shaping liquid that solidifies the powder onto the powder so as to solidify a predetermined part thereof are repeatedly performed to manufacture the intended three-dimensional shaped object in the container.

For example, a disclosed apparatus is configured to form a base layer of a overhung part in a (k+1)th layer during a bonding step of a k-th layer, for the purpose of preventing bonding liquid (shaping liquid) from permeating into a lower layer when the overhung part is formed (Japanese Patent No. 5,471,939).

According to the powder lamination shaping method of the binder-jet type, when the shaping liquid permeates into the powder, the density of the powder is increased by the liquid bridge force of the shaping liquid, so that the thickness of the powder layer is reduced. However, because the shrinking direction is random, an error may occur in the length or the shape of the intended three-dimensional shaped object, also in locations other than the overhung part such as, for example, the bottom face of the shaped object.

SUMMARY OF THE INVENTION

According to one aspect of the present invention, a three-dimensional shaping apparatus includes a storage unit, a supplying unit, a discharging unit, and a controlling unit. The storage unit is configured to store powder. The supplying unit is configured to supply the powder to the storage unit to form a layer of the powder. The discharging unit is configured to discharge shaping liquid to solidify the powder onto the powder. The controlling unit is configured to generate a control signal for controlling the supplying unit and the discharging unit based on shaping data indicating a shape of a three-dimensional shaped object. The controlling unit is configured to generate the control signal for laminating at least one sacrificial layer separable from at least one shaping layer corresponding to the three-dimensional shaped object in such a position that the at least one sacrificial layer is under the at least one shaping layer, prior to laminating the at least one shaping layer, based on the shaping data and powder information stored in advance and indicating change in thickness of a layer of the powder caused by permeation of the shaping liquid.

BRIEF DESCRIPTION OF THE DRAWINGS

FIG. 19 is a diagram for explaining an example of powder information corresponding to a situation where stainless steel powder is used as the powder;

FIG. 24 is a diagram for explaining an example of the powder information corresponding to a situation where zirconia powder is used as the powder.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
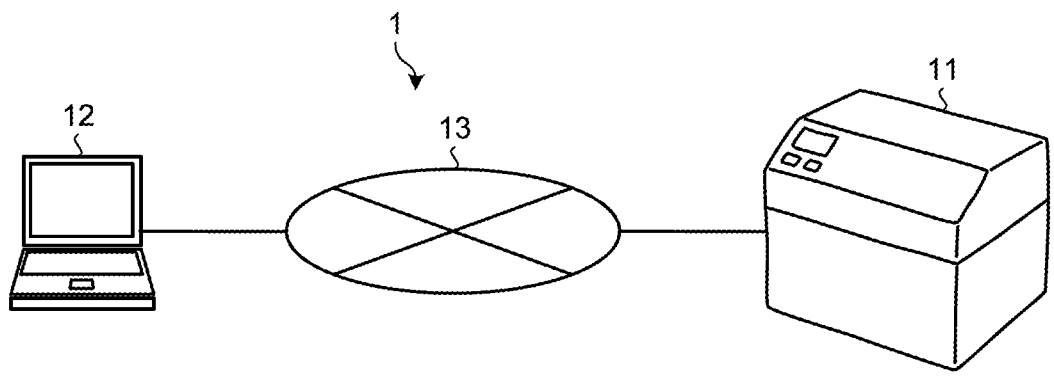
FIG. 1 is a diagram for explaining an overview of an exemplary hardware configuration of a three-dimensional shaping system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to improve the precision in shaping the three-dimensional shaped object.

FIG. 1 is a diagram for explaining an overview of an exemplary hardware configuration of a three-dimensional shaping system according to an embodiment.

A three-dimensional shaping system 1 includes a three-dimensional shaping apparatus (hereinafter, simply "shaping apparatus") 11, an information processing terminal 12, and a network 13.

The shaping apparatus 11 is an apparatus configured to form a three-dimensional shaped object having an arbitrary shape by a powder lamination shaping method of a binder-jet type to. In the powder lamination shaping method of the binder-jet type, a step of supplying material powder to the inside of a container in a predetermined amount at a time so as to form a powder layer and a step of discharging shaping liquid that solidifies the powder onto the powder so as to solidify a predetermined part thereof are repeatedly performed to manufacture the intended three-dimensional shaped object in the container.

The information processing terminal 12 is an apparatus configured to generate a control signal for controlling the shaping apparatus 11. The information processing terminal 12 may be, for example, a general-purpose computer, a tablet, a smartphone, or the like provided with a Micro Processing Unit (MPU), a Read-Only Memory (ROM), a Random Access Memory (RAM), and an external storage device configured with a semiconductor memory device or the like. However, possible embodiments of the information processing terminal 12 are not limited to these examples.

The network 13 is a computer network that is either well-known or novel and makes it possible for the shaping apparatus 11 and the information processing terminal 12 to transmit and receive signals to and from each other, while ensuring a communication speed required for controlling processes.

Although FIG. 1 illustrates the example in which the single shaping apparatus 11 and the single information processing terminal 12 are connected to each other via the network 13, two or more shaping apparatuses 11 and/or two or more information processing terminals 12 may be provided.

Figure 2:
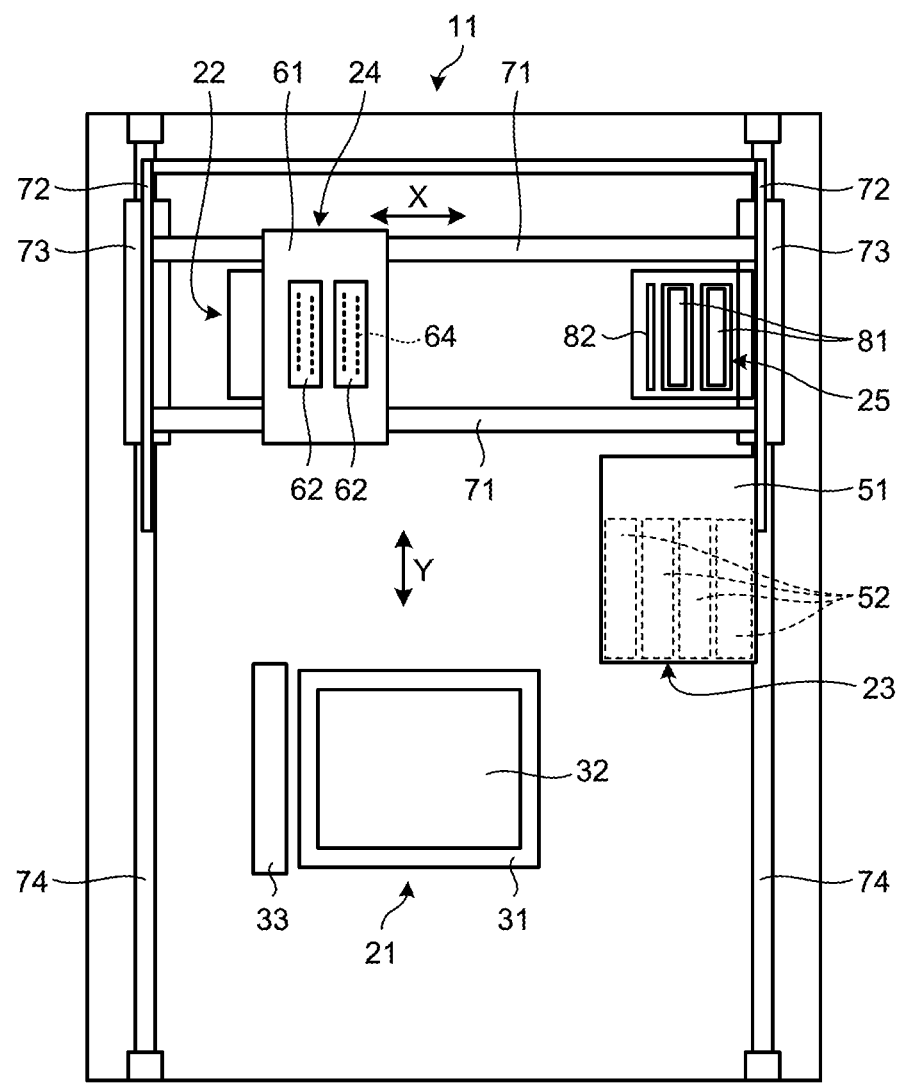
FIG. 2 is a top view of an exemplary hardware configuration of a shaping apparatus according to a first aspect.

FIG. 2 is a top view of an exemplary hardware configuration of a shaping apparatus according to a first aspect.

Figure 3:
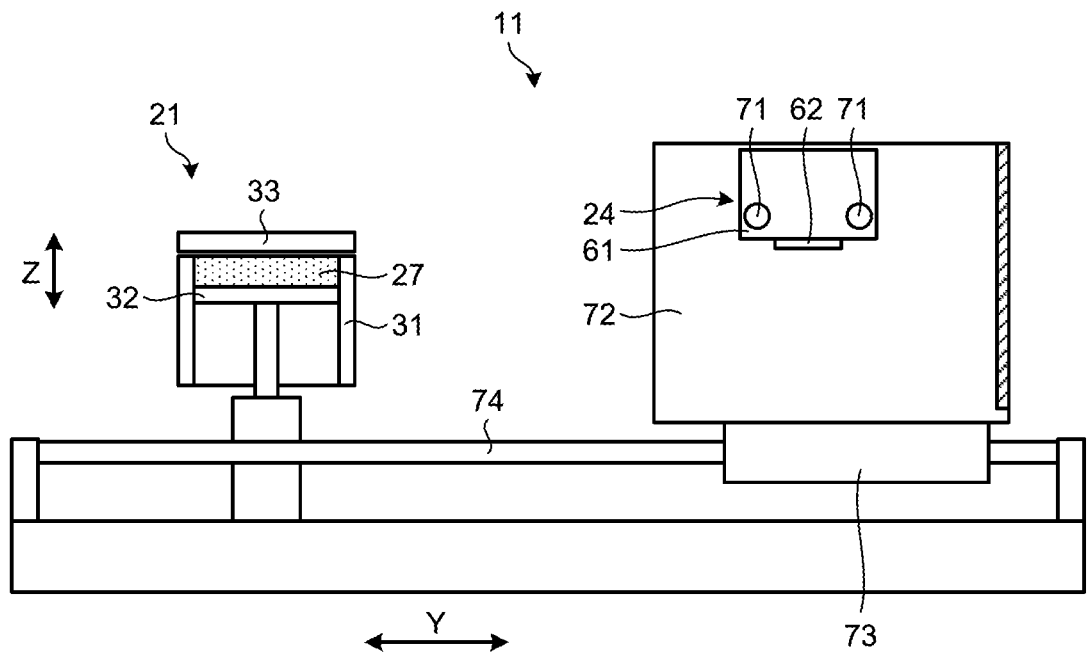
FIG. 3 is an exemplary lateral view of a part of the hardware configuration of the shaping apparatus according to the first aspect.

FIG. 3 is an exemplary lateral view of a part of the hardware configuration of the shaping apparatus according to the first aspect.

Figure 4:
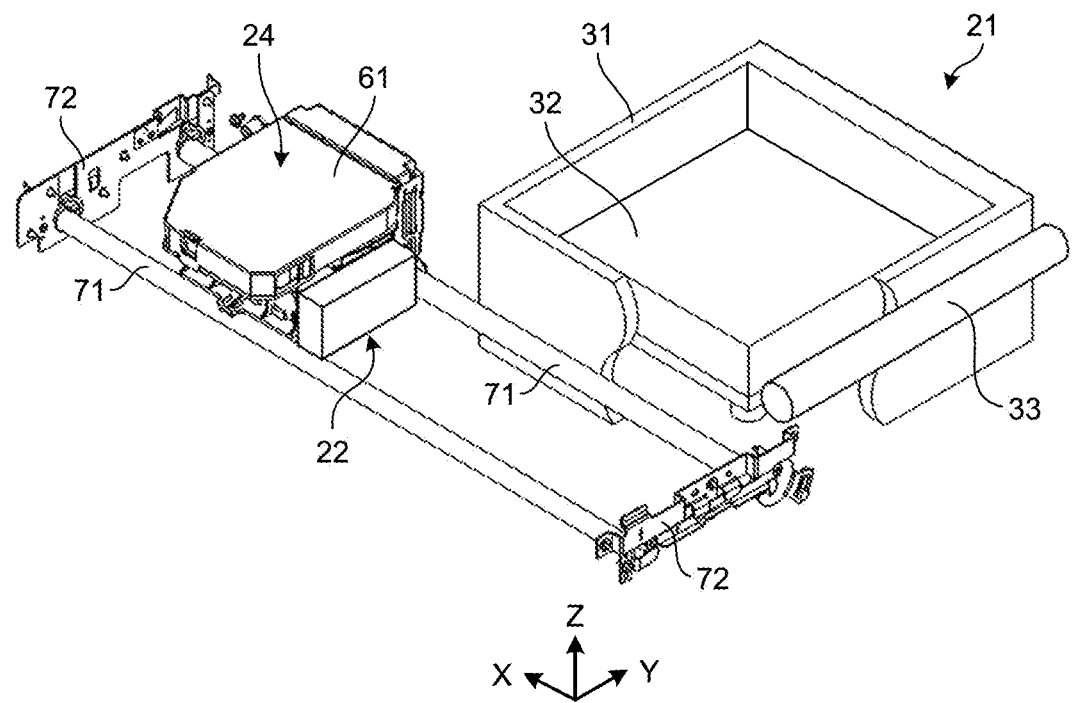
FIG. 4 is an exemplary perspective view of a part of the hardware configuration of the shaping apparatus according to the first aspect.

FIG. 4 is an exemplary perspective view of a part of the hardware configuration of the shaping apparatus according to the first aspect.

Figure 5:
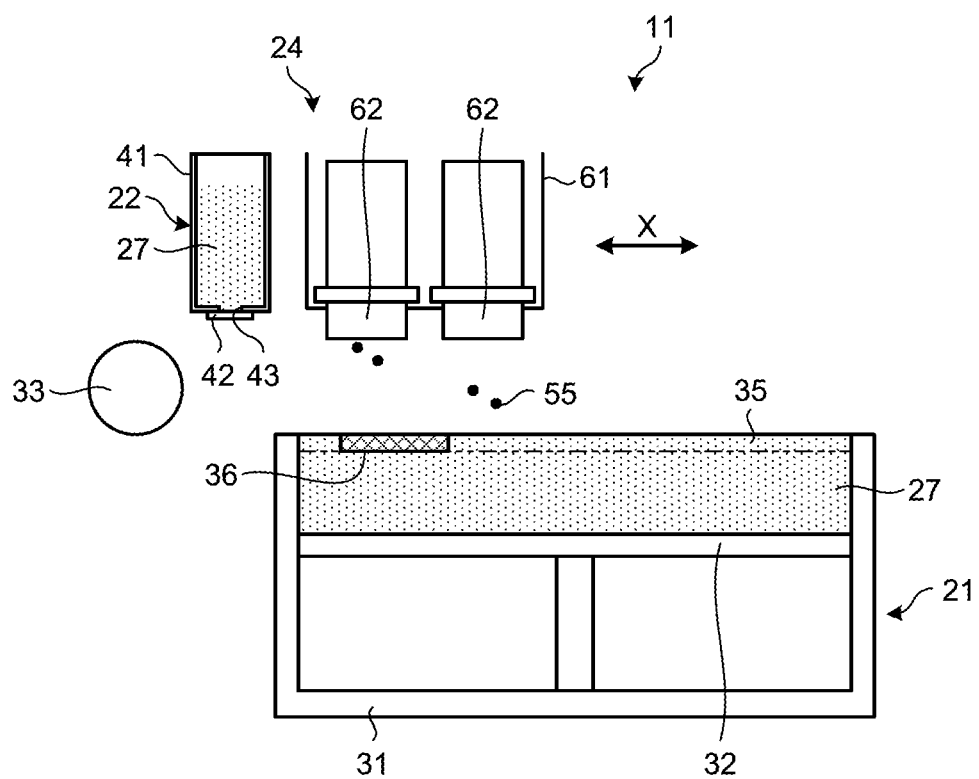
FIG. 5 is a view for explaining an exemplary operational state of the shaping apparatus according to the first aspect.

FIG. 5 is a view for explaining an exemplary operational state of the shaping apparatus according to the first aspect.

The shaping apparatus 11 includes a storage unit 21, a supplying unit 22, a shaping liquid reservoir unit 23, a discharging unit 24, and a maintenance unit 25.

The storage unit 21 is a unit configured to store therein powder 27 for forming the three-dimensional shaped object. The storage unit 21 includes a shaping chamber 31, a shaping stage 32, and a roller 33.

The shaping chamber 31 is a member configured to store therein the powder 27 supplied thereto from the supplying unit 22 (explained later) and to have the three-dimensional shaped object formed in the inside thereof.

The shaping stage 32 is a member positioned at the bottom of the shaping chamber 31 and is configured to move in the Z-direction. The volume of the shaping chamber 31 changes as a result of raising and lowering the shaping stage 32. The shaping stage 32 is lowered as the number of layers of the powder 27 increases.

The roller 33 is a member configured to flatten the surface of the powder 27 supplied from the supplying unit 22 to the inside of the shaping chamber 31. The roller 33 is configured to move in the X-direction and also to rotate.

The supplying unit 22 is a unit configured to supply the powder 27 to the storage unit 21 (the shaping chamber 31) and includes a storing container 47 and a shutter 42.

The storing container 41 is a container configured to store the powder 27 therein. An opening 43 is formed in a lower end part of the storing container 41. The storing container 41 is fixed to a carriage 61 of the discharging unit 24 (explained later) and is configured to move together with the carriage 61.

The shutter 42 is a member configured to open and close the opening 43 of the storing container 41. The amount of the powder 27 supplied to the shaping chamber 31 is adjusted according to the time period during which the shutter 42 is open.

The shaping liquid reservoir unit 23 is a unit configured to store therein shaping liquid 55 that solidifies the powder 27. The shaping liquid reservoir unit 23 includes a tank attaching member 51 and tanks 52.

The tank attaching member 51 is a member configured to detachably fix the tanks 52.

The tanks 52 are each a member configured to store the shaping liquid 55 on the inside thereof. In the present example, the plurality of tanks 52 are installed, and mutually-different types of shaping liquid 55 may be stored in the tanks 52. Examples of the shaping liquid include a liquid the main component of which is water and that contains any of the following: an aqueous medium containing alcohol, ether, ketone, and/or the like; aliphatic hydrocarbons; an ether-based solvent such as glycol ether; an ester-based solvent such as ethyl acetate; a ketone-based solvent such as methyl ethyl ketone; and a higher alcohol; however, possible embodiments are not limited to these examples. The inside of each of the tanks 52 is in communication with discharging heads 62 of the discharging unit 24 (explained later) via passages (not illustrated).

The discharging unit 24 is a unit configured to discharge the shaping liquid 55 onto the powder 27 provided in the storage unit 21 (the shaping chamber 31). The discharging unit 24 includes the carriage 61 and the discharging heads 62.

The carriage 61 is a member configured to fix the supplying unit 22 and the discharging heads 62. The carriage 61 is linked to first rails 71 installed in parallel to the X-direction and is configured to move (to change the position thereof) along the first rails 71 (in the X-direction). The two ends of each of the first rails 71 are fixed to lateral plates 72. The lateral plates 72 are fixed to sliders 73. The sliders 73 are linked to second rails 74 installed in parallel to the Y-direction and are configured to move (to change the position thereof) along the second rails 74 (in the Y-direction). The second rails 74 are configured to move in the Z-direction. In this structure, the carriage 61 is capable of moving in a three-dimensional manner. As the carriage 61 moves, the supplying unit 22 and the discharging heads 62 fixed to the carriage 61 also move.

The discharging heads 62 are each a member configured to discharge the shaping liquid 55 stored in the tanks 52 toward the powder 27 provided in the shaping chamber 31. The discharging heads 62 each including a plurality of nozzles 64 directed downward. The discharging heads 62 and the tanks 52 are in communication with each other via passages (not illustrated). In the present example, two discharging heads 62 are provided. The discharging heads 62 may discharge mutually-different types of shaping liquid 55.

The maintenance unit 25 is a unit configured to perform maintenance on the discharging unit 24 and includes caps 81 and a wiper 82.

The caps 81 are configured to adhere closely to the surfaces of the discharging heads 62 where the nozzles 64 are formed and to suck the shaping liquid 55 out of the nozzles 64. As a result, it is possible to remove the powder 27 clogging the nozzles 64 and the shaping liquid 55 that has become highly concentrated. Further, by covering the nozzles 64 with the caps 81 when the shaping liquid 55 is not being discharged, it is possible to prevent the powder 27 from erroneously entering the nozzles 64 and to prevent the shaping liquid 55 from getting dry.

The wiper 82 is a member configured to wipe the surfaces of the discharging heads 62 where the nozzles 64 are formed.

The storage unit 21, the supplying unit 22, the shaping liquid reservoir unit 23, the discharging unit 24, and the maintenance unit 25 are controlled on the basis of the control signal provided from the information processing terminal 12. For example, the supplying of the powder 27 to the shaping chamber 31, the moving of the carriage 61, the discharging of the shaping liquid 55, the selection of the type of the shaping liquid 55 to be discharged, the execution of the maintenance, and the like are controlled on the basis of the control signal. As a result of an operation of the shaping apparatus 11, as illustrated in FIG. 5, a layer 35 of the powder 27 is formed in an upper layer part of the shaping chamber 31. As a result of discharging the shaping liquid 55 onto the layer 35, a shaping layer 36 obtained by solidifying the powder 27 is formed. As a result of laminating together shaping layers 36 of multiple layers 35, the intended three-dimensional shaped object is formed.

Figure 6:
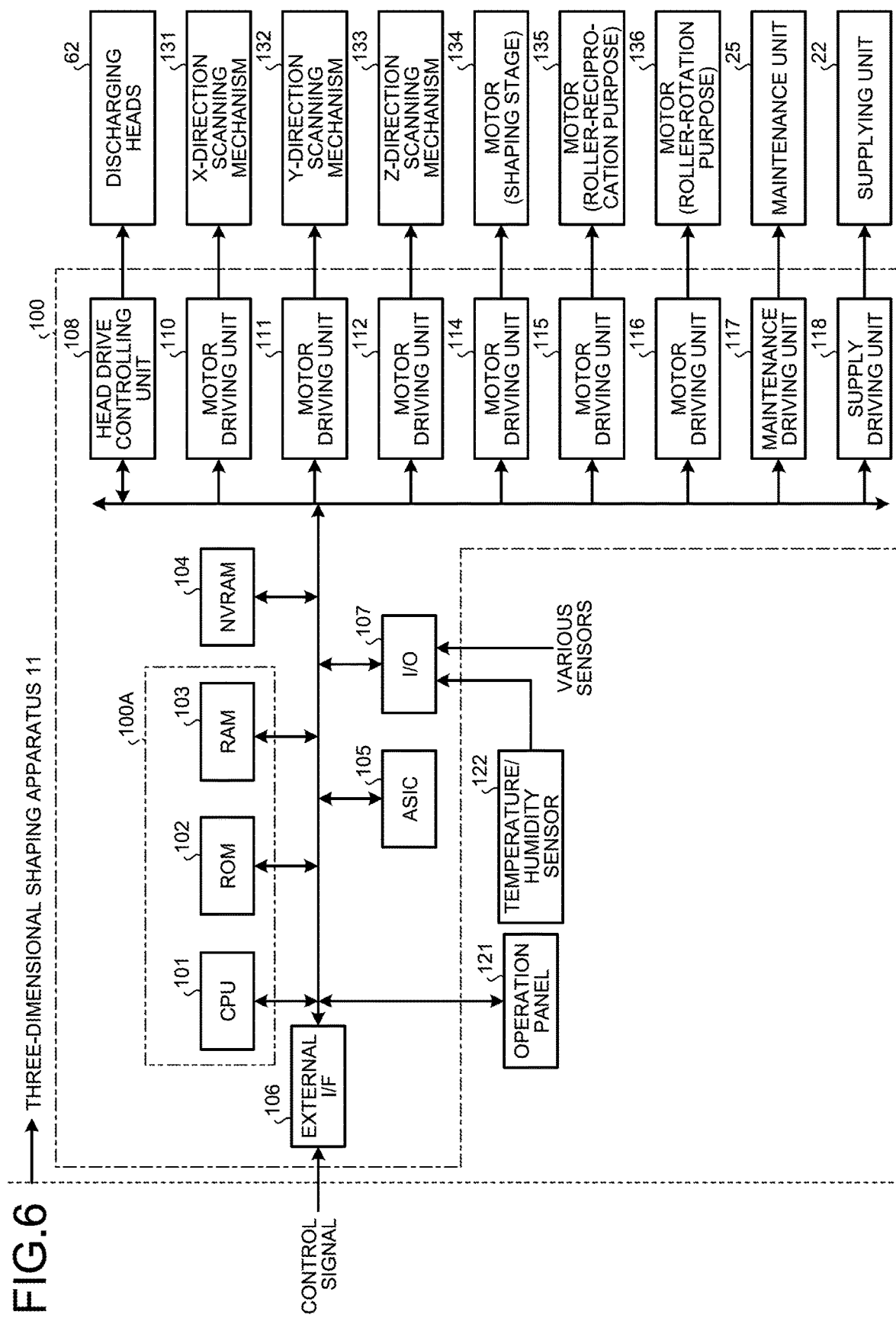
FIG. 6 is a diagram for explaining an exemplary internal hardware configuration of the shaping apparatus according to the first aspect.

FIG. 6 is a diagram for explaining an exemplary internal hardware configuration of the shaping apparatus according to the first aspect.

A controlling unit 100 of the shaping apparatus 11 includes a main controlling unit 100A. The main controlling unit 100A includes: a Central Processing Unit (CPU) 101 configured to exercise overall control of the shaping apparatus 11; a Read-Only Memory (ROM) 102 configured to store therein a program that controls the CPU 101 and other fixed data; and a Random Access Memory (RAM) 103 configured to temporarily store therein the control signal and the like.

The controlling unit 100 includes a non-volatile memory (Non-Volatile RAM [NVRAM]) 104, an Application Specific Integrated Circuit (ASIC) 105, an external interface (I/F) 106, and an Input/Output (I/O) unit 107.

The NVRAM 104 is a memory for holding data even while the power source of the apparatus is shut down. The ASIC 105 is configured to perform an image processing process on three-dimensional shaping data and other processing processes such as a processing process on input/output signals for controlling the entirety of the apparatus. The external I/F 106 is configured to receive the control signal output from the information processing terminal 12. The I/O unit 107 is configured to obtain an input of a detection signal from any of various types of sensors including a temperature/humidity sensor 122.

The controlling unit 100 includes a head drive controlling unit 108 configured to control driving of the discharging heads 62.

The controlling unit 100 includes a motor driving unit 110 configured to drive an X-direction scanning mechanism 131 that causes the carriage 61 to move in the X-direction, a motor driving unit 111 configured to drive a Y-direction scanning mechanism 132 that causes the carriage 61 to move in the Y-direction, and a motor driving unit 112 configured to drive a Z-direction scanning mechanism 133 that causes the carriage 61 to move in the Z-direction.

Further, the controlling unit 100 includes a motor driving unit 114 configured to drive a motor 134 that raises and lowers the shaping stage 32, a motor driving unit 115 configured to drive a motor 135 that causes the roller 33 to reciprocate along the X-direction, and a motor driving unit 116 configured to drive a motor 136 that causes the roller 33 to rotate.

Further, the controlling unit 100 includes a maintenance driving unit 117 configured to drive the maintenance unit 25 and a supply driving unit 118 configured to drive the supplying unit 22 (the shutter 42).

The I/O unit 107 is configured to receive an input of a detection signal from the temperature/humidity sensor 122 or the like, the temperature/humidity sensor 122 being configured to detect temperature and humidity levels representing environment conditions. The controlling unit 100 has connected thereto an operation panel 121 for inputting necessary information to the shaping apparatus 11 and displaying information is connected to the controlling unit 100.

FIGS. 7 to 10 illustrate a procedure for forming the three-dimensional shaped object.

Figure 7:
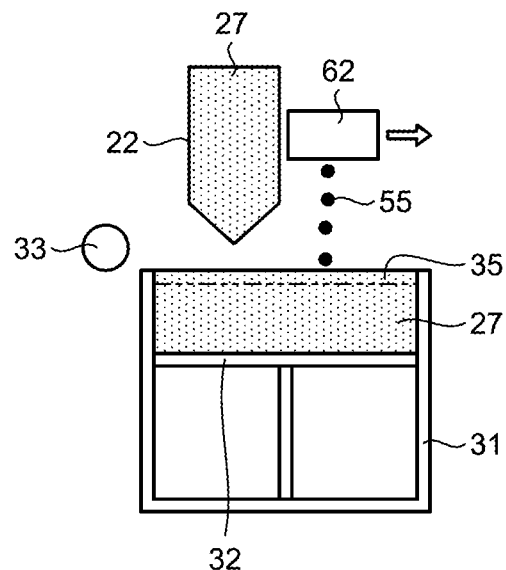
FIG. 7 is a view for explaining a manner in which shaping liquid is being discharged onto a powder layer by the shaping apparatus according to the first aspect.

FIG. 7 is a view for explaining a manner in which shaping liquid is being discharged onto a powder layer by the shaping apparatus according to the first aspect.

Figure 8:
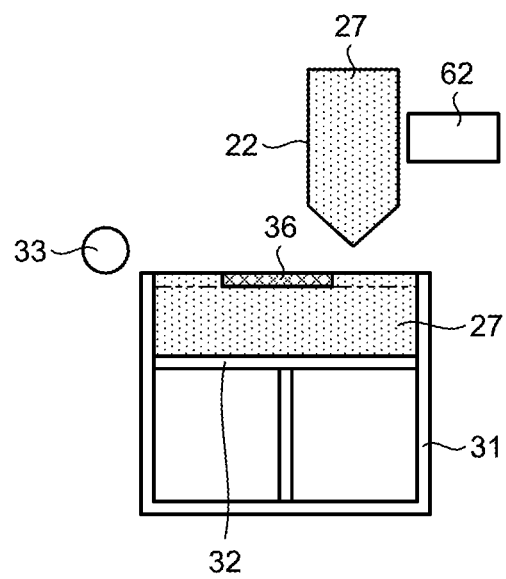
FIG. 8 is a view for explaining a state in which a shaping layer has been formed by the shaping apparatus according to the first aspect.

FIG. 8 is a view for explaining a state in which a shaping layer has been formed by the shaping apparatus according to the first aspect.

FIG. 8 illustrates the state in which the shaping layer 36 has been formed as a result of solidifying the part onto which the shaping liquid 55 was discharged.

Figure 9:
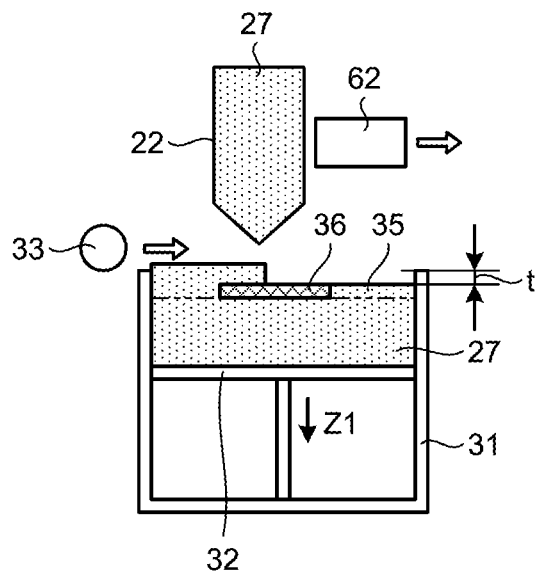
FIG. 9 is a view for explaining a manner in which a new batch of powder is being supplied onto a layer containing a shaping layer, by the shaping apparatus according to the first aspect.

FIG. 9 is a view for explaining a manner in which a new batch of powder is being supplied onto a layer containing a shaping layer, by the shaping apparatus according to the first aspect.

FIG. 9 illustrates the manner in which the powder 27 stored in the supplying unit 22 is being supplied to the inside of the shaping chamber 31. In this situation, the shaping stage 32 is lowered in the direction indicated by the arrow Z1, so that the length from the top face of the layer 35 containing the shaping layer 36 to the upper end of the shaping chamber 31 becomes equal to t. In this situation t denotes the thickness of the single layer 35. Thereafter, the supplying unit 22 moves toward the right side of the drawing while dropping the powder 27. The roller 33 moves across the top face of the shaping chamber 31 toward the right side of the drawing, while rotating to flatten the top surface of the powder 27 provided within the area of the shaping stage 32, while being in contact with the upper end of the shaping stage 32. As a result, a state is achieved where the powder 27 is supplied up to the upper end of the shaping stage 32.

Figure 10:
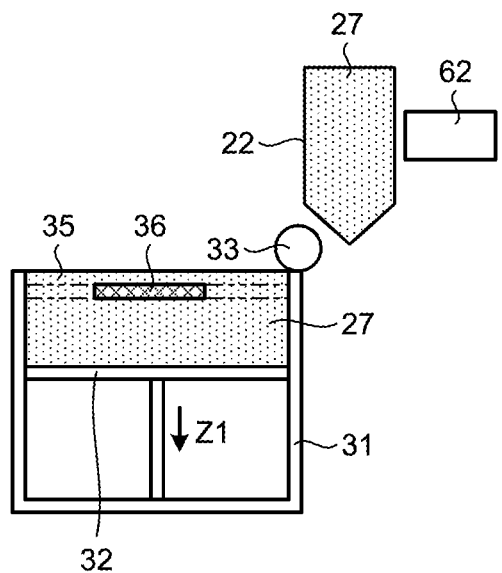
FIG. 10 is a view for explaining a state in which a previous layer has been recoated with a new powder layer by the shaping apparatus according to the first aspect.

FIG. 10 is a view for explaining a state in which the previous layer has been recoated with a new powder layer by the shaping apparatus according to the first aspect.

FIG. 10 illustrates the state in which the layers containing the shaping layer 36 are recoated with a new layer 35, as a result of the roller 33 moving across the top face of the shaping chamber 31 up to the right end of the drawing.

Figure 11:
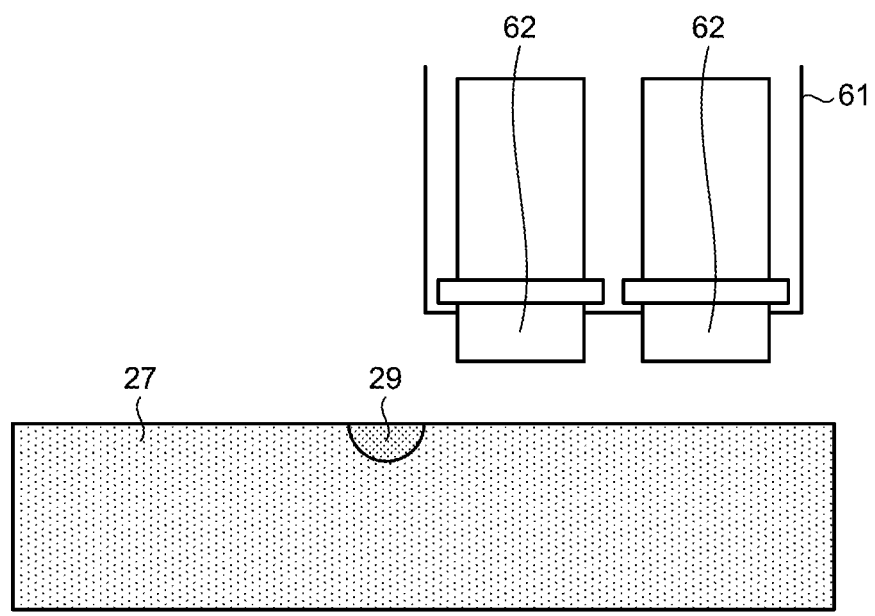
FIG. 11 is a view for explaining an example of a state of powder on which shaping liquid has been discharged by the shaping apparatus according to the first aspect.

FIG. 11 is a view for explaining an example of a state of the powder on which the shaping liquid has been discharged by the shaping apparatus according to the first aspect.

The example in FIG. 11 illustrates a permeation state when generating two-dimensional image data with a pitch of 300×300 dpi (corresponding to approximately 85 μm) and discharging a droplet 29 of the shaping liquid 55 so that the droplet 29 lands on the powder 27 on the basis of the generated data. It is desirable that the amount of liquid in the single droplet 29 is exactly as much as necessary to permeate the thickness t (e.g., 100 μm) of the single layer 35. It is possible to empirically learn the amount of liquid in the droplet 29. For example, the droplet 29 may be dropped onto the powder 27 spread to fill the area of a glass substrate with a thickness of 100 μm. In that situation, using a camera to observe the surface opposite from the surface on which the droplet was dropped, it is possible to judge whether or not the shaping liquid 55 corresponding to the droplet 29 has permeated the thickness of 100 μm. By repeatedly performing such an experiment while varying the amount of liquid in the droplet 29, it is possible to find out the amount of liquid in the droplet 29 required to exactly permeate the thickness of 100 μm.

Figure 12:
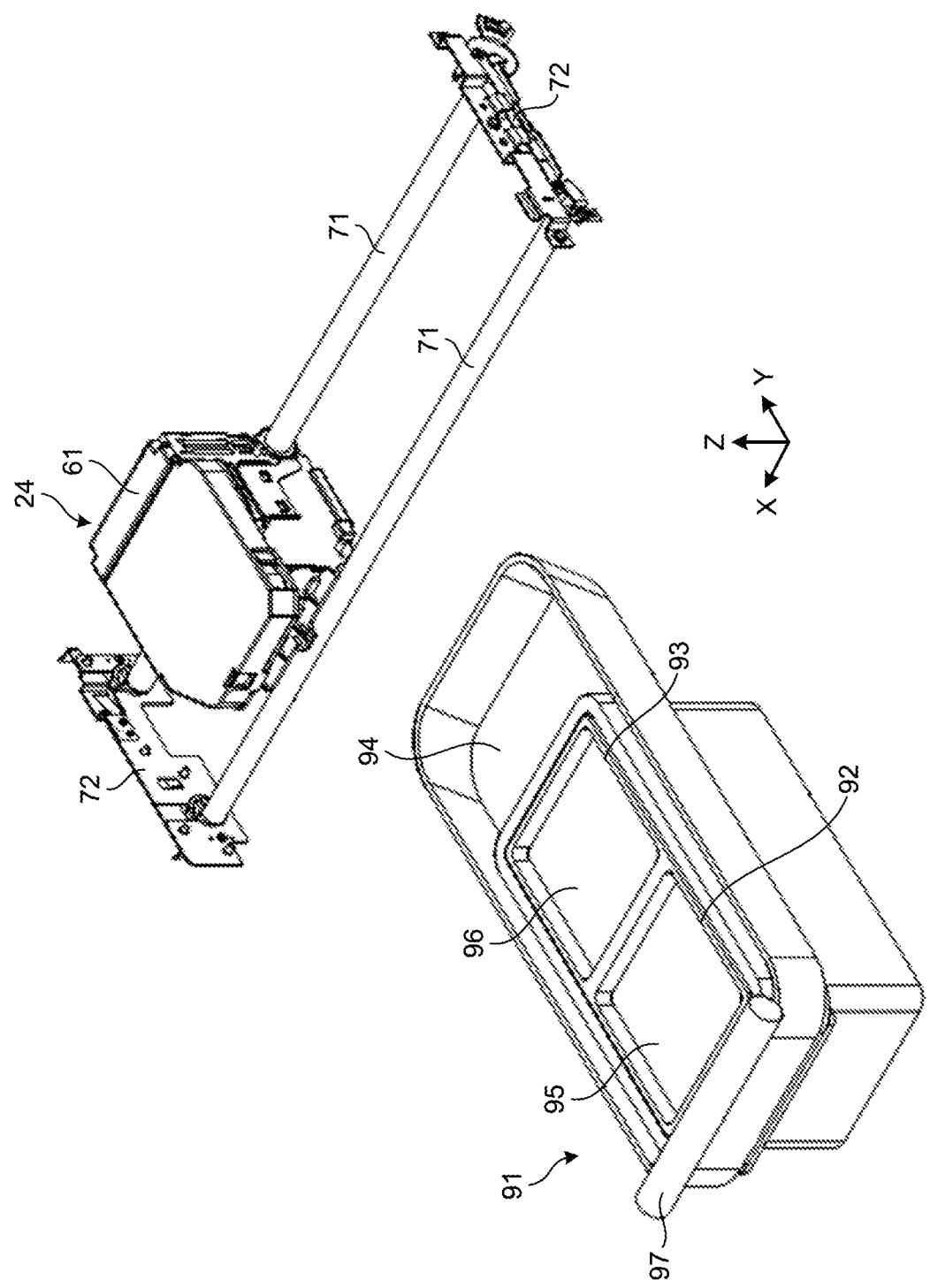
FIG. 12 is a perspective view for explaining a part of a hardware configuration of a shaping apparatus according to a second aspect.

FIG. 12 is a perspective view for explaining a part of a hardware configuration of a shaping apparatus according to a second aspect.

The second aspect illustrated in FIG. 12 is different from the first aspect illustrated in FIGS. 2 to 5 for the mechanism in supplying the powder 27 to a shaping chamber 93. The configuration according to the second aspect includes a storing/supplying unit 91.

The storing/supplying unit 91 includes a supplying chamber 92, the shaping chamber 93, a surplus receiving chamber 94, a supplying stage 95, a shaping stage 96, and a roller 97.

The supplying chamber 92 is a member configured to store therein the powder 27 to be transported to the shaping chamber 93.

The shaping chamber 93 is a member configured to store therein the powder 27 transported thereto from the supplying chamber 92 and to have a three-dimensional shaped object formed in the inside thereof.

The surplus receiving chamber 94 is a member configured to receive surplus powder 27 spilling from the supplying chamber 92 and the shaping chamber 93.

The supplying stage 95 is installed at the bottom of the supplying chamber 92 and is configured to move in parallel to the Z-direction. The supplying stage 95 is raised when the powder 27 is supplied, so as to push up the powder 27 above the upper end of the supplying chamber 92.

The shaping stage 96 is installed at the bottom of the shaping chamber 93 and is configured to move in parallel to the Z-direction. The shaping stage 96 is lowered when the powder 27 is supplied, so as to ensure that the powder 27 transported thereto from the supplying chamber 92 is received into the shaping chamber 93.

The roller 97 is a member configured to reciprocate along the Y-direction and also to rotate. The roller 97 is configured to move along the Y-direction when the powder 27 is supplied and to transport the powder 27 raised above the supplying chamber 92 to the shaping chamber 93. In that situation, as a result of the roller 97 rotating, the surface of the powder 27 provided in the shaping chamber 93 is flattened.

It is possible to adjust the amount of the powder 27 supplied to the shaping chamber 93 by adjusting, for example, how much the supplying stage 95 is raised and how much the shaping stage 96 is lowered.

By using the configuration according to the second aspect, it is also possible to form a three-dimensional shaped object in the same manner as in the first aspect illustrated in FIGS. 2 to 5.

Figure 13:
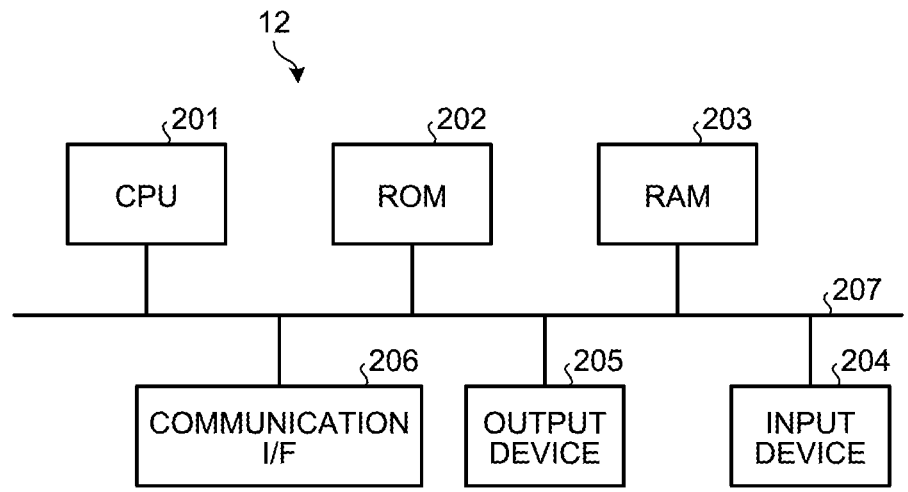
FIG. 13 is an overview diagram of hardware of an information processing terminal according to an embodiment.

FIG. 13 is an overview diagram of hardware of an information processing terminal according to an embodiment.

The information processing terminal 12 includes a CPU 201, a ROM 202, a RAM 203, an input device 204, an output device 205, a communication interface (I/F) 206, and a bus 207. The CPU 201 is configured to perform a predetermined arithmetic process according to a control program stored in the ROM 202 while using the RAM 203 as a working area. The input device 204 is a device for receiving an input of information from the outside thereof and may be configured with, for example, a keyboard, a mouse, a touch panel and/or the like. The output device 205 is a device for outputting information generated on the inside to the outside and may be configured with a display device, for example. The communication I/F 206 is a device that makes it possible to transmit and receive signals to and from the shaping apparatus 11 or the like via the network 13.

Figure 14:
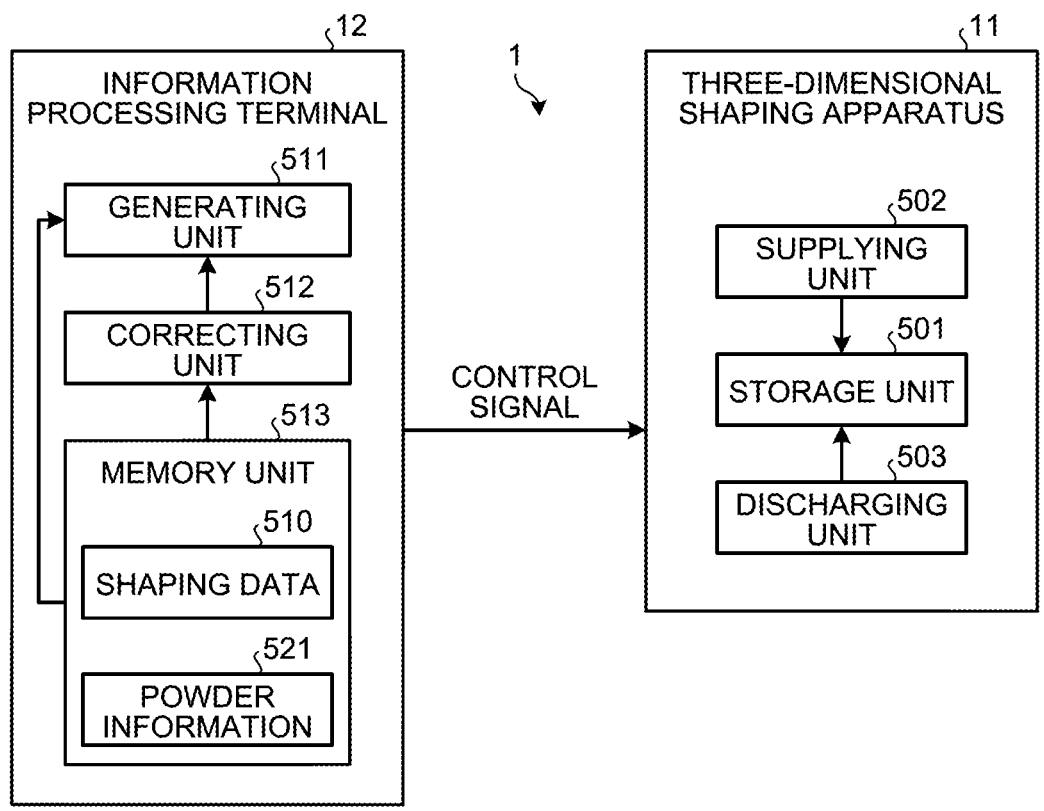
FIG. 14 is a functional configuration block diagram of a three-dimensional shaping system according to an embodiment.

FIG. 14 is a functional configuration block diagram of a three-dimensional shaping system according to an embodiment.

The shaping apparatus 11 includes a storage unit 501, a supplying unit 502, and a discharging unit 503. The information processing terminal 12 includes a generating unit 511, a correcting unit 512, and a memory unit 513.

The storage unit 501 is configured to store therein the supplied powder 27 and to have a three-dimensional shaped object formed in the inside thereof. The storage unit 501 may be realized using, for example, the shaping chamber 31 according to the first aspect illustrated in FIGS. 2 to 5 or the shaping chamber 93 according to the second aspect illustrated in FIG. 12; however, possible embodiments are not limited to these examples.

The supplying unit 502 is configured to supply the powder 27 to the storage unit 501 in accordance with the control signal from the information processing terminal 12. The supplying unit 502 may be realized using, for example, the supplying unit 22 according to the first aspect or the supplying chamber 92, the supplying stage 95, and the roller 97 according to the second aspect, or the like; however, possible embodiments are not limited to these examples.

The discharging unit 503 is configured to discharge the shaping liquid 55 onto the powder 27 provided in the storage unit 501 in accordance with the control signal output from the information processing terminal 12. The discharging unit 503 may be realized using, for example, the shaping liquid reservoir unit 23 and the discharging unit 24 according to the first aspect, or the like; however, possible embodiments are not limited to these examples.

The generating unit 511 is configured to generate the control signal for controlling the supplying unit 502 and the discharging unit 503. The control signal is generated on the basis of shaping data 510 stored in the memory unit 513. The shaping data 510 is information indicating the shape of the intended three-dimensional shaped object and includes a designed thickness (the length of the mass of the powder 27 in the lamination direction) of the three-dimensional shaped object. The shaping data 510 may be data for a three-dimensional Computer-Aided Design system (3D-CAD) or the like in, for example, a Standard Triangulated Language (STL) format or a Virtual Reality Modeling Language (VRML) format. The shaping data 510 may be generated from, for example, a two-dimensional design diagram or three-dimensional scan data of the three-dimensional shaped object. The method for obtaining the shaping data 510 shall not particularly be limited. The shaping data 510 may be obtained, for example, through an input operation performed by a user, an input from another device, or information read from a storage medium or the like. The generating unit 511 may be realized by a collaboration or the like of the CPU 201, the control program stored in the ROM 202, the RAM 203 functioning as a working area, an appropriate logic Integrated Circuit (IC), and the like; however, possible embodiments are not limited to these examples.

The correcting unit 512 is configured to correct the shaping data 510 on the basis of powder information 521 stored in the memory unit 513. The powder information 521 is information indicating changes in the thickness of the layer 35 of the powder 27 caused by permeation of the shaping liquid 55. It is desirable to generate a plurality of pieces of powder information 521 in correspondence with different types of powder 27. On the basis of the powder information 521, the correcting unit 512 is configured to correct the shaping data 510 so as to supplement a reduction amount in the thickness of the layer 35 after the shaping liquid 55 is discharged. For example, the correcting unit 512 corrects the shaping data 510 so as to increase the designed thickness of the intended three-dimensional shaped object. The correcting unit 512 may be realized by a collaboration or the like of the CPU 201, the control program stored in the ROM 202, the RAM 203 functioning as a working area, an appropriate logic Integrated Circuit (IC), and the like; however, possible embodiments are not limited to these examples.

The memory unit 513 is configured to store therein the shaping data 510, the powder information 521, and other appropriate pieces of information. The memory unit 513 may be realized using the ROM 202, the RAM 203 functioning as a temporary storage area, and the like; however, possible embodiments are not limited to these examples.

Although FIG. 14 illustrates an example in which the powder information 521 is held inside the information processing terminal 12, the powder information 521 may be held in a storage device provided on the outside of the information processing terminal 12.

The control program configured to realize functions of the generating unit 511 and the correcting unit 512 (including the function of either obtaining or generating the shaping data 510) may be provided as being recorded on a computer-readable recording medium such as a Compact Disk Read-Only Memory (CD-ROM), a Flexible Disk (FD), a Compact Disk Recordable (CD-R), or a Digital Versatile Disk (DVD), in a file in an installable format or an executable format.

The control program may be configured so as to be provided as being stored in a computer (a server) connected to the network 13 such as the Internet and being downloaded via the network 13. The control program may be configured so as to be provided or distributed via the network 13. Alternatively, the control program may be configured so as to be provided as being incorporated in the ROM 202 or the like in advance.

The control program may be configured as a module including the functional units (the generating unit 511 and the correcting unit 512) described above. In that situation, as a result of the CPU 201 reading and executing the control program from the ROM 202, the functional units are generated in the RAM 203.

Figure 15:
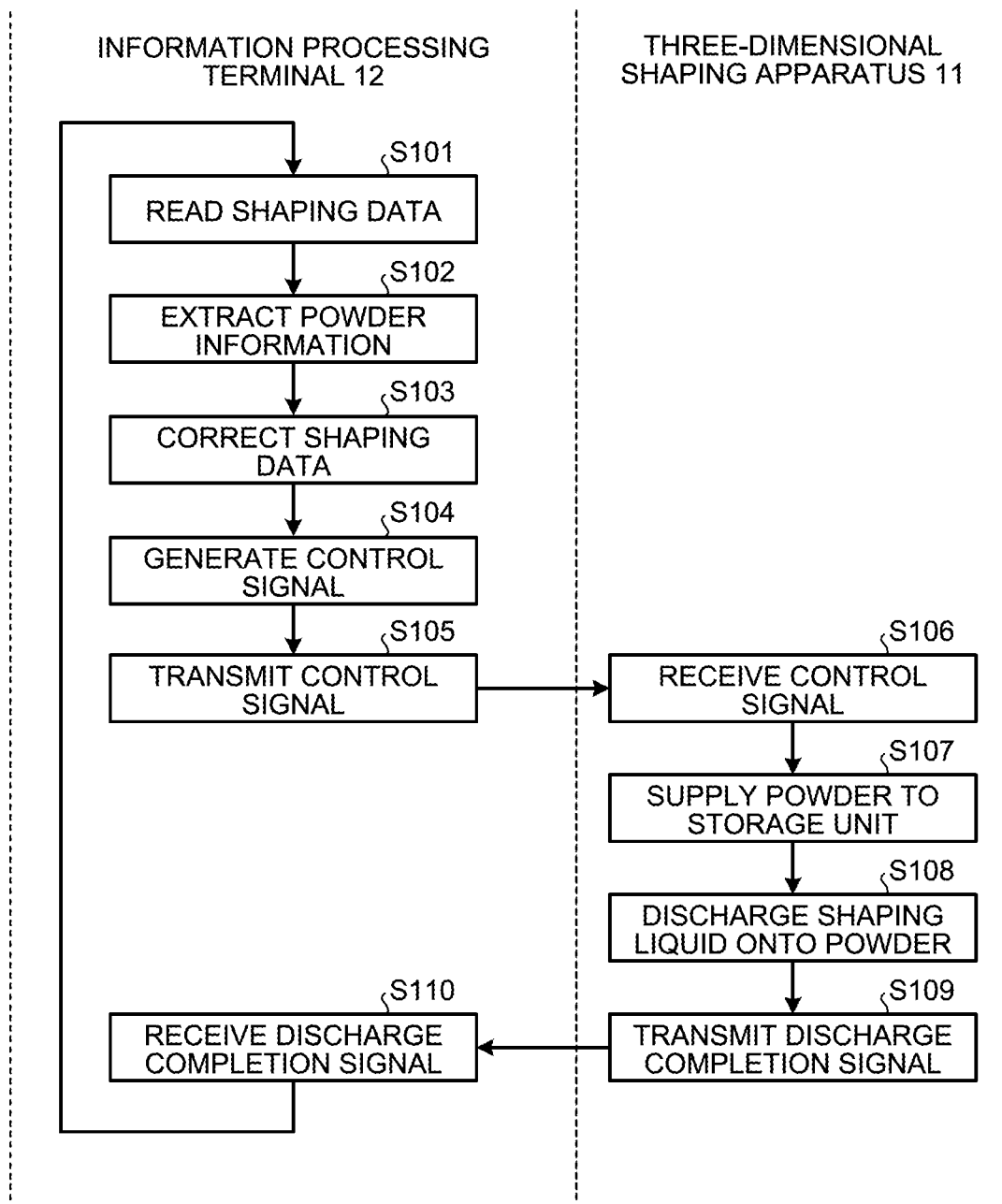
FIG. 15 is a flowchart of an exemplary process performed by the three-dimensional shaping system according to an embodiment.

FIG. 15 is a flowchart of an exemplary process performed by the three-dimensional shaping system according to an embodiment.

The information processing terminal 12 reads the shaping data 510 of an intended three-dimensional shaped object (step S101) and extracts the powder information 521 corresponding to the powder 27 to be used (step S102). On the basis of the powder information 521, the information processing terminal 12 corrects the shaping data 510 so as to supplement the reduction amount of the layer 35 after the shaping liquid 55 is discharged (step S103).

The information processing terminal 12 generates a control signal for controlling the supplying unit 502 and the discharging unit 503 on the basis of the shaping data 510 corrected at step S103 (step S104) and transmits the control signal to the shaping apparatus 11 (step S105).

When having received the control signal (step S106), the shaping apparatus 11 supplies the powder to the storage unit 501 on the basis of the control signal (step S107) and discharges the shaping liquid 55 onto the powder 27 provided in the storage unit 501 (step S108). Thereafter, the shaping apparatus 11 transmits a discharge completion signal indicating that the discharging of the shaping liquid 55 has been completed (step S109).

Having received the discharge completion signal (step S110), the information processing terminal 12 reads the shaping data 510 again (step S101) and repeatedly performs the processes in the same manner to performs the shaping.

Next, a principle of the exemplary embodiments will be explained before providing a detailed description of the embodiments.

It would be ideal if the thickness of the shaped object was equal to the predetermined thickness (t=100 μm) as a result of the shaping liquid 55 being dropped onto the powder 27 provided in the storage unit 501. Further, by repeatedly performing such shaping is repeatedly performed ten times to form a shaped object having a thickness of 1000 μm, for example.

However, the shaping in actuality does not work in this manner generally.

In the following sections, how shaping is performed in actuality will be explained.

Figure 16:
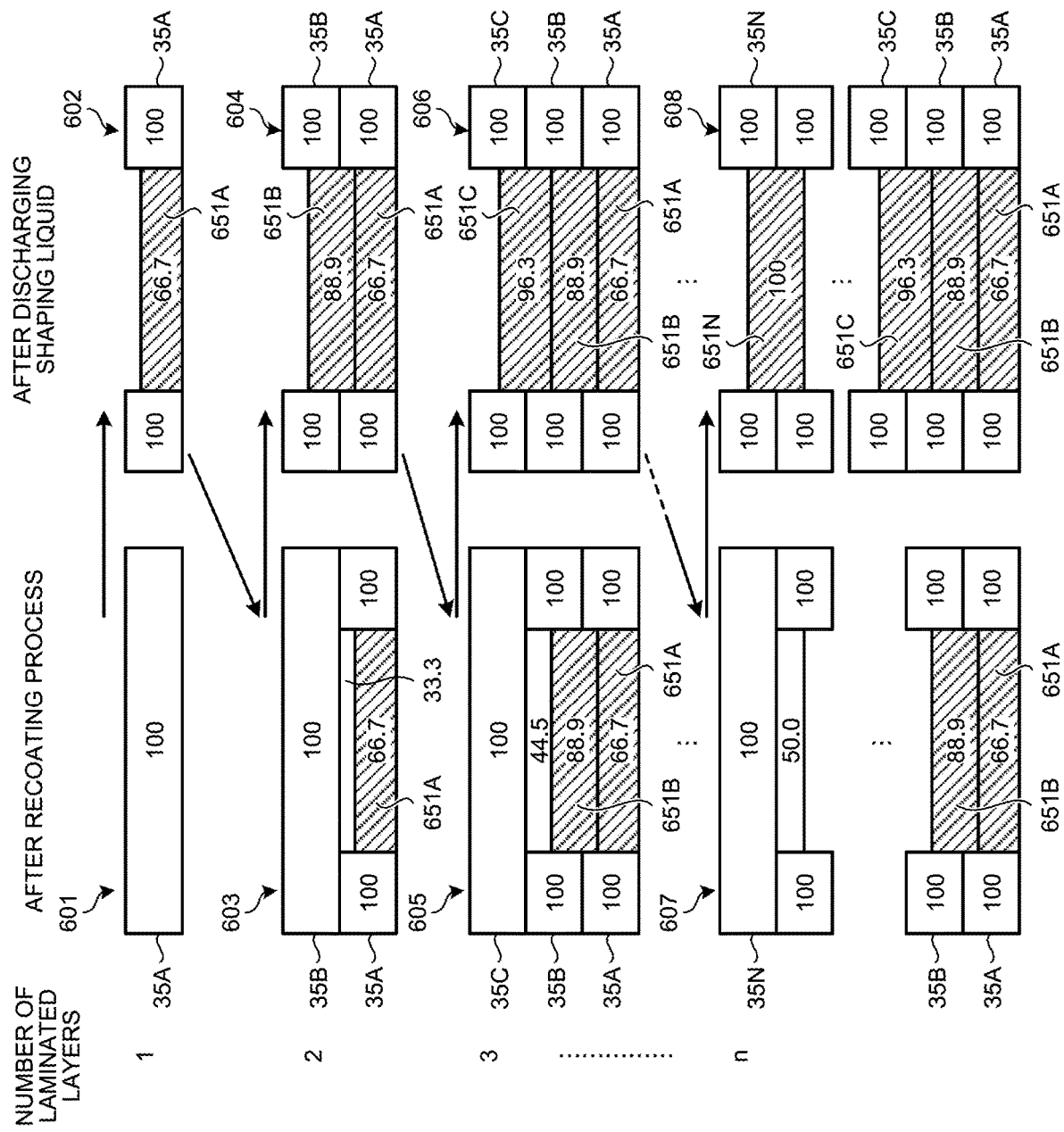
FIG. 16 is a view for explaining how shaping is performed in actuality.

FIG. 16 is a view for explaining how shaping is performed in actuality.

In a first state 601, the thickness of a first layer 35A of the powder 27 with which the previous layer was recoated is equal to 100 μm. Similarly, in the example in FIG. 16, the designed value t for the thickness of a layer of the powder 27 that is laminated in the recoating process at each time is assumed to be 100 μm.

A second state 602 illustrates the situation after the shaping liquid 55 is discharged onto the first layer 35A of the powder 27. The thickness of a first permeation part 651A where the shaping liquid 55 has permeated in the first layer 35A is reduced (decreased). In the present example, the thickness is reduced from 100 μm to 66.7 μm. The reason is that the powder 27 sank due to a liquid bridge force of the shaping liquid 55 discharged onto the powder 27 and the gravity.

In that situation, because no shaping liquid 55 at all is applied to the powder 27 in the first layer, the friction among the powder particles is relatively small, and the powder 27 is therefore in a free state.

Accordingly, when the shaping liquid 55 is dropped onto the powder 27 in the free state, the powder 27 aggregates also in the horizontal direction due to the liquid bridge force, so that a gap is formed as illustrated in FIG. 16.

Figure 17:
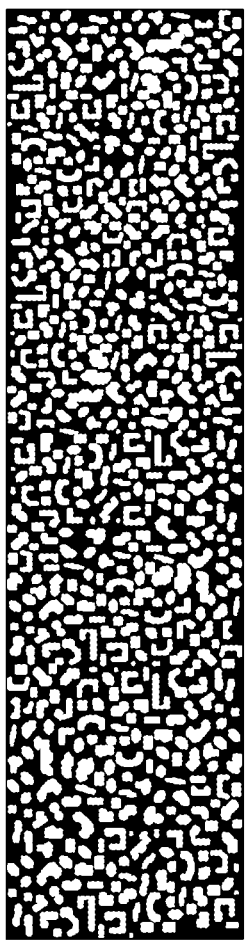
FIG. 17 is a planar schematic view illustrating a situation where a gap is formed.

FIG. 17 is a planar schematic view illustrating the situation where the gap is formed.

FIG. 16 schematically illustrates the situation where the gap is formed in the left-and-right direction. In contrast, when the situation illustrated in FIG. 16 is rendered in a planar view, it is observed that the gap is formed randomly in the direction perpendicular to the Z-axis so that, as illustrated in FIG. 17, the powder 27 aggregates in a reticulate formation (or with a patchy pattern).

Subsequently, the first layer in this state is recoated with a second layer.

In other words, a third state 603 illustrates the situation where the layer 35A in the second state 602 is recoated with a second layer 35B of the powder 27. With the recoating process at this time, the thickness reduction amount 33.3 μm in the first permeation part 651A is also supplemented with the powder 27, so that the total thickness of the first layer 35A and the second layer 35B is equal to 200 μm.

In this situation, as for the powder 27 in the second layer and the layers thereafter, because the friction against the movement of the powder particles in the horizontal direction increases due to an impact from the shaping liquid 55 in the layer positioned underneath (e.g., the first layer for the second layer), the movement of the powder particles in the lamination direction (the vertical direction) affected by the gravity is dominant.

A fourth state 604 illustrates the situation after the shaping liquid 55 is discharged on the second layer 35B of the powder 27. The thickness of a second permeation part 651B where the shaping liquid 55 has permeated in the second layer 35B is reduced. In the present example, the thickness is reduced from 133.3 μm to 88.9 μm.

A fifth state 605 illustrates the situation where the layer 35B in the fourth state 604 is recoated with a third layer 35C of the powder 27. With the recoating process at this time, a reduction amount of 44.5 μm that is a total of the thickness reduction amount in the first permeation part 651A and the thickness reduction amount in the second permeation part 651B is supplemented, so that the total thickness of the first layer 35A, the second layer 35B, and the third layer 35C is equal to 300 μm.

A sixth state 606 illustrates the situation after the shaping liquid 55 is discharged on the third layer 35C of the powder 27. The thickness of a third permeation part 651C where the shaping liquid 55 has permeated in the third layer 35C is reduced. In the present example, the thickness is reduced from 144.5 μm to 96.3 μm.

A seventh state 607 illustrates the situation where the previous layer is recoated with an n-th layer 35N of the powder 27. With the recoating process at this time, the reduction amount of 50 μm that is a total of the reduction amounts in the first to the (n−1)th permeation parts (651A, 651B, and so on) is supplemented, so that the total thickness of the first layer 35A to the n-th layer 35N is equal to (100×n) μm.

An eighth state 608 illustrates the situation after the shaping liquid 55 is discharged on the n-th layer 35N of the powder 27. The thickness of an n-th permeation part 651N where the shaping liquid 55 has permeated in the n-th layer 35N is reduced. In the present example, the thickness is reduced from 150 μm to 100 μm.

As explained above, the thicknesses (66.7 μm, 88.9 μm, 96.3 μm, . . . , and 100 μm) of the plurality of permeation parts 651A to 651N that are in the laminated relationship increase as the number of laminated layers increases, so as to gradually become close to the designed value 100 μm for the thickness of the layer increased in the recoating processes.

Figure 18:
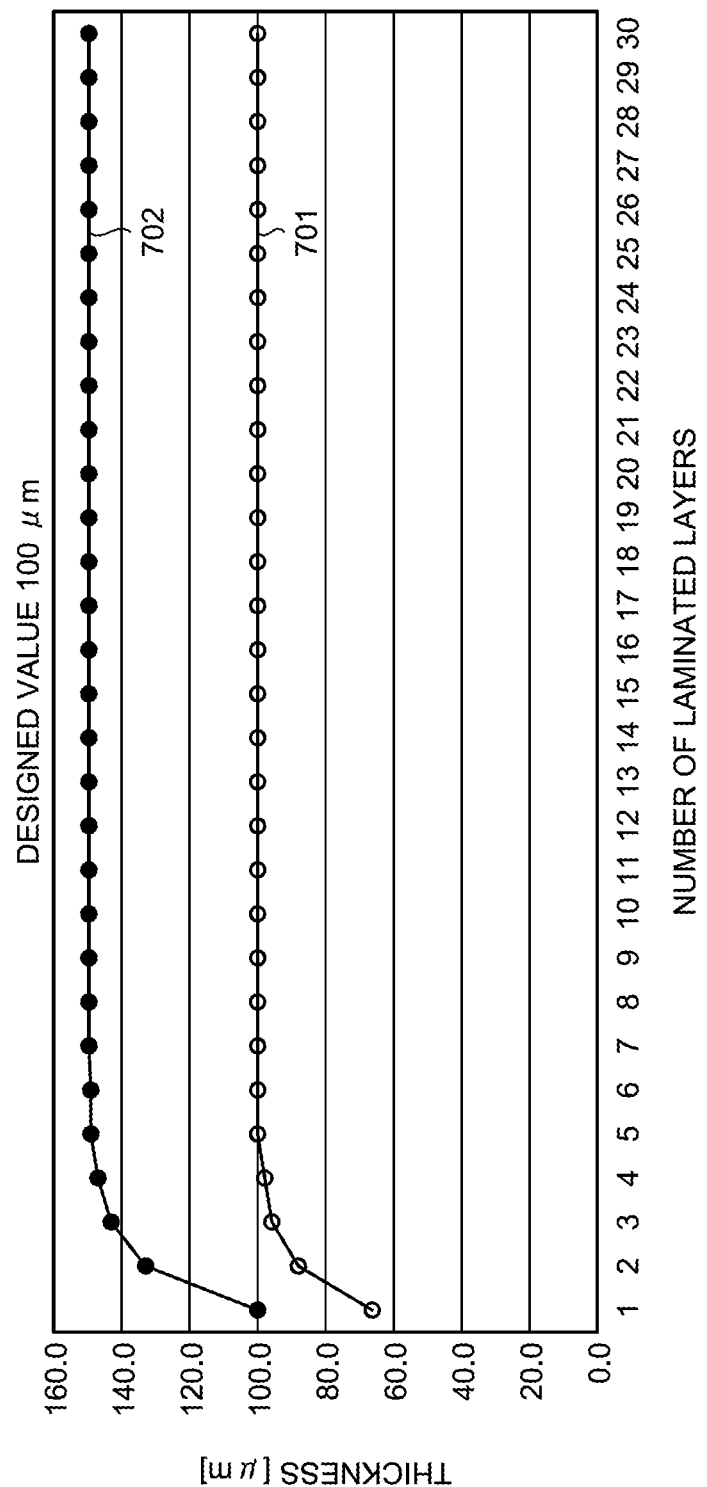
FIG. 18 is a chart illustrating a relationship between the thickness of a permeation part and the thickness increasing in actuality with respect to the number of laminated layers.

FIG. 18 is a chart illustrating a relationship between the thickness of a permeation part and the thickness increasing in actuality with respect to the number of laminated layers.

FIG. 18 illustrates an example in which stainless steel powder is used as the powder 27.

Used as the powder 27 was powder obtained by coating stainless steel powder (Gas-atomized powder PSS 316L, 20-μm grade, manufactured by Sanyo Special Steel Co., Ltd.) with a binder made of organic materials (acetoacetyl-group-modified polyvinyl alcohol: GOHSENX Z-100 manufactured by Nippon Synthetic Chemical Industry Co., Ltd.).

In this situation, possible embodiments of the binder (the resin material) made of organic materials are not limited to the example above. For instance, it is possible to use any of the following: polyvinyl alcohol (PVA-205C, PVA-220C manufactured by Kuraray Co., Ltd.); polyacrylic acid (JU-RYMER AC-10 manufactured by TOAGOSEI CO., LTD.); polyacrylic acid sodium (JURYMER AC-103P manufactured by TOAGOSEI CO., LTD.); acetoacetyl group-modified polyvinyl alcohol (GOHSENX Z-300, GOHSENX Z-100, GOHSENX Z-200, GOHSENX Z-205, GOHSENX Z-210, or GOHSENX Z-220 manufactured by Nippon Synthetic Chemical Industry Co., Ltd.); carboxy group-modified polyvinyl alcohol (GOHSENX T-330, GOHSENX T-350, or GOHSENX T-330T manufactured by Nippon Synthetic Chemical Industry Co., Ltd.); butanediol vinyl alcohol copolymer (Nichigo G-polymer OKS-8041 manufactured by Nippon Synthetic Chemical Industry Co., Ltd.); carboxymethyl cellulose (CELLOGEN 5A manufactured by DKS Co., Ltd.); starch (HISTARD PSS-5 manufactured by Sanwa Starch Co., Ltd.); and gelatin (beMatrix Gelatin manufactured by Nitta Gelatin Inc.).

Further, as the shaping liquid 55, a liquid the main component of which is water and that contains any of the following that accounts for approximately 30% was used: an aqueous medium containing an alcohol such as ethanol, ether, ketone, and/or the like; aliphatic hydrocarbons; an ether-based solvent such as glycol ether; an ester-based solvent such as ethyl acetate; a ketone-based solvent such as methyl ethyl ketone; and a higher alcohol.

In this situation, FIG. 18 illustrates a relationship between the number of laminated layers and the thicknesses of the permeation parts 651A to 651N and a relationship between the number of laminated layers and the thicknesses of the layers 35A to 35N increasing in actuality in the recoating processes.

Further, in FIG. 18, the first asymptote 701 illustrates the relationship between the number of laminated layers and the thicknesses of the permeation parts 651A to 651N. The second asymptote 702 illustrates the relationship between the number of laminated layers and the thicknesses of the layers 35A to 35N increasing in actuality in the recoating processes.

In FIG. 18, as indicated by the first asymptote 701, as the number of laminated layers increases, the thicknesses of the permeation parts 651A to 651N gradually become close to the designed value 100 μm for the thickness of the layer increasing in the recoating processes. In the present example, the thicknesses of the permeation parts 651A to 651N become equal to approximately 100 μm when the number of laminated layers reaches five and hardly change thereafter. Accordingly, as indicated by the second asymptote 702, the thicknesses of the layers 35A to 35N increased in actuality in the recoating processes become equal to approximately 150 μm when the number of laminated layers reaches five and hardly change thereafter. Consequently, it is understood that, in the fifth layer and the layers thereafter, the shrinking effect of the layers caused by the sinking of the powder 27 due to the impacts of the liquid bridge force of the shaping liquid 55 discharged onto the powder 27 and the gravity becomes constant.

The degree by which each of the permeation parts 651A to 651N shrinks can be defined by the powder density ρr (the space factor εr=1−ρr) observed at the time of the recoating process and the powder density ρi (the space factor εi=1−ρi) after the shaping liquid is discharged. When stainless steel is used as the powder 27, ρr=40% (εr=60%) and ρi=60% (εi=40%) are satisfied. When such an increase in the density of the powder 27 caused by the permeation of the shaping liquid 55 is exhibited in accordance with the changes of the layers 35A to 35N in the thickness direction (In actuality, the changes in the thickness direction are dominant due to the effect of the gravity), the thickness changes from 100 μm to approximately 66.7 μm, as illustrated in the second state 602, for example. Similarly, the thickness changes from 133.3 μm to approximately 88.9 μm, as illustrated in the fourth state 604. Further, when the number of laminated layers has reached the predetermined value (five in the present example), the thickness of the permeation part 651N is substantially equal to the designed value 100 μm for the thickness increased in the recoating processes.

When t (100 μm) denotes the designed thickness of each of the layers 35A to 35N (the designed thickness of each single layer), while $t_i$ denotes the thickness of each of the layers 35A to 35N (the permeation parts 651A to 651N) (the actual thickness of each single layer) after the shaping liquid is discharged, it is possible to define the shrinking ratio k of the layers 35A to 35N as $k=t_i/t$. To satisfy $t_i=t$, the thickness after the recoating process (before the shaping liquid discharge) needs to be $t/k=t^2/t_i$ ($k(t^2/t_i)=t$).

It is possible to express $t_n$ denoting the thickness of each of the layers 35A to 35N (the permeation parts 651A to 651N) (the actual thickness of each single layer) after the shaping liquid is discharged on the n-th layer, using Expression (1) below.

$$t_n = k\left(nt - \sum_{j=1}^{n-1} t_j\right) \quad (1)$$

where n is an integer selected from among 1, 2, 3, . . . , and m, while m denotes the total number of lamination levels (laminated layers).

It is possible to express $t_r$ denoting the thickness of all the layers (the actual thickness of the entire three-dimensional shaped object) formed by discharging the shaping liquid 55 on each of the plurality of layers 35A to 35N, using Expression (2) below.

$$t_r\left(\frac{m(m+1)}{2}t - \sum_{n=1}^{m}(m-n)t_n\right)k \quad (2)$$

Accordingly, the reduction amount (the total reduction amount) of the thickness of the entire three-dimensional shaped object formed by the lamination is equal to the difference between m×t and $t_r$. By adding the total reduction amount to the designed thickness of the entire three-dimensional shaped object, it is possible to supplement the shrinking of the powder 27 caused by the permeation of the shaping liquid 55. The method for adding the total reduction amount is not particularly limited. For example, the total reduction amount may equally be divided (by the total number of laminated layers) and added to the designed value for the thickness of the three-dimensional shaped object in each of the layers. Alternatively, the total reduction amount may be distributed and added to the designed value for the thickness of the three-dimensional shaped object in each of the layers, so as to supplement reduction amounts that are different among the layers.

FIG. 19 is a diagram for explaining an example of the powder information corresponding to the situation where stainless steel powder is used as the powder.

In FIG. 19, the letter "m" denotes the total number of laminated layers and is equal to 10 in the present example. The letter "t" denotes the designed value for the thickness of the single layer (the thickness of each single layer) increased in the recoating processes and is equal to 100 μm in the present example. The designed thickness mt denotes the designed thickness of the entirety of the intended three-dimensional shaped object and is equal to 10×100=1,000 μm in the present example. The letters "$t_i$" denote the thickness (the actual thickness) after discharging the shaping liquid 55 on a layer having the thickness t and is equal to 66.6 μm in the present example. The letter "k" denotes the shrinking ratio of the layer caused by the permeation of the shaping liquid 55, and $t_i/t=0.666$ is satisfied in the present example. The letter "n" denotes the number of laminated layers. The letters "$t_n$" denote an approximate value of the thickness of each of the permeation parts 651A to 651N in the laminated layers. The letters "$t_r$" denotes the actual thickness of the entire three-dimensional shaped object and is the value calculated using Expression (2). The second term of $t_r$ denotes the value in the second term of Expression (2) for each of the layers. The first term of $t_r$ denotes the value in the first term of Expression (2) and is equal to 5,500 in the present example. The sum of the second terms of $t_r$ denotes the value of the sum of the second terms of Expression (2) and is equal to 4,074 in the present example.

In FIG. 19, the difference from the designed thickness is the difference between the designed thickness (the designed thickness of the entire three-dimensional shaped object) mt (=1,000 μm) and the actual thickness of the entire three-dimensional shaped object $t_r$ (=950 μm) and is equal to 50 μm in the present example. It is desirable to add the difference 50 μm to the designed thickness 1,000 μm to correct the shaping data 510. With this arrangement, the thickness of the entire three-dimensional shaped object eventually obtained becomes equal to the designed thickness mt (=1,000 μm).

Incidentally, although no powder 27 is present underneath the first layer in the example of FIG. 16 explained above, extra powder 27 is typically provided in advance underneath the first layer of the powder 27 in actual shaping.

Figure 20:
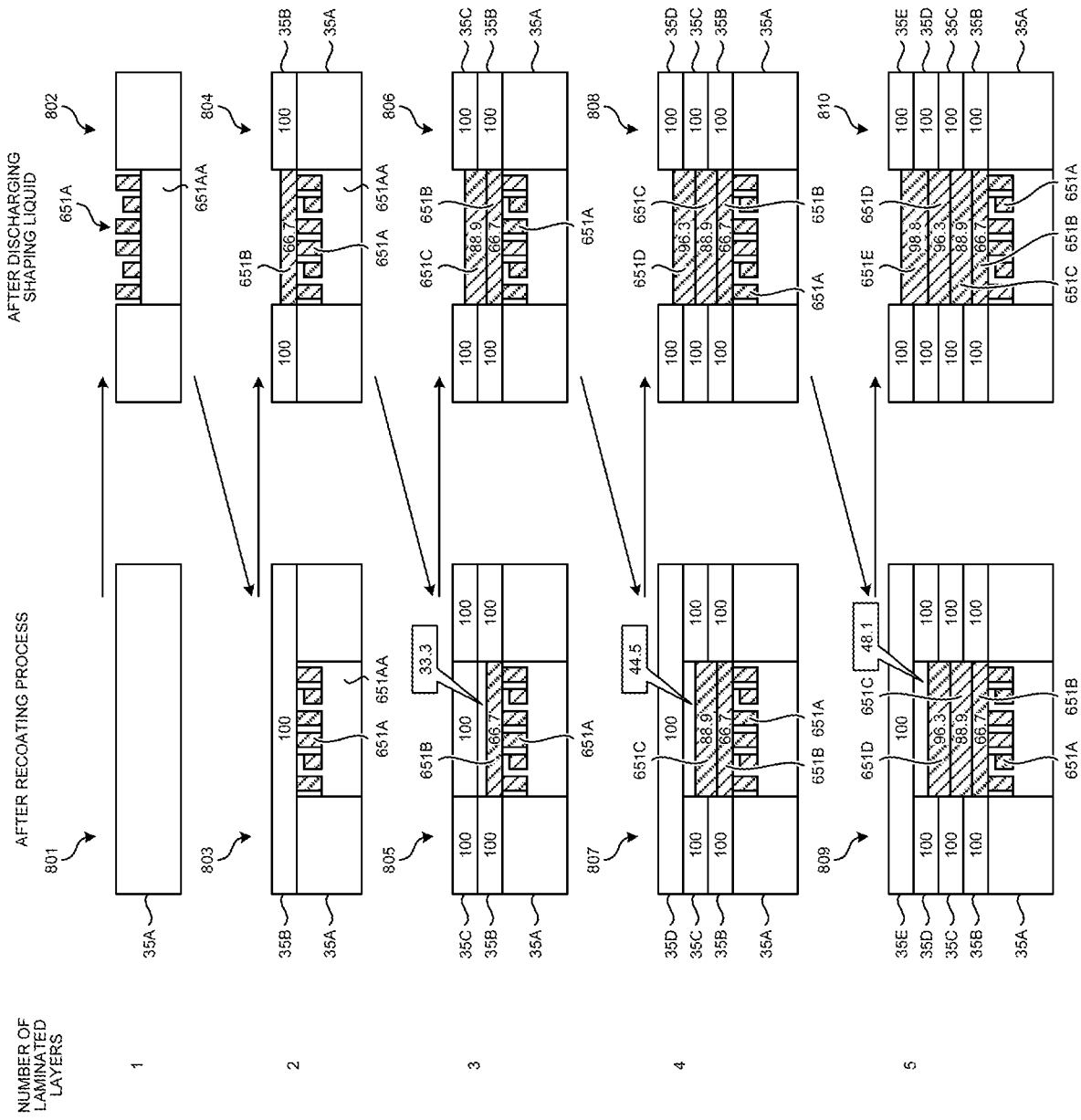
FIG. 20 is a first view for explaining a situation in which powder is provided prior to shaping the first layer.

FIG. 20 is a first view for explaining a situation in which powder is provided prior to shaping the first layer.

Figure 21:
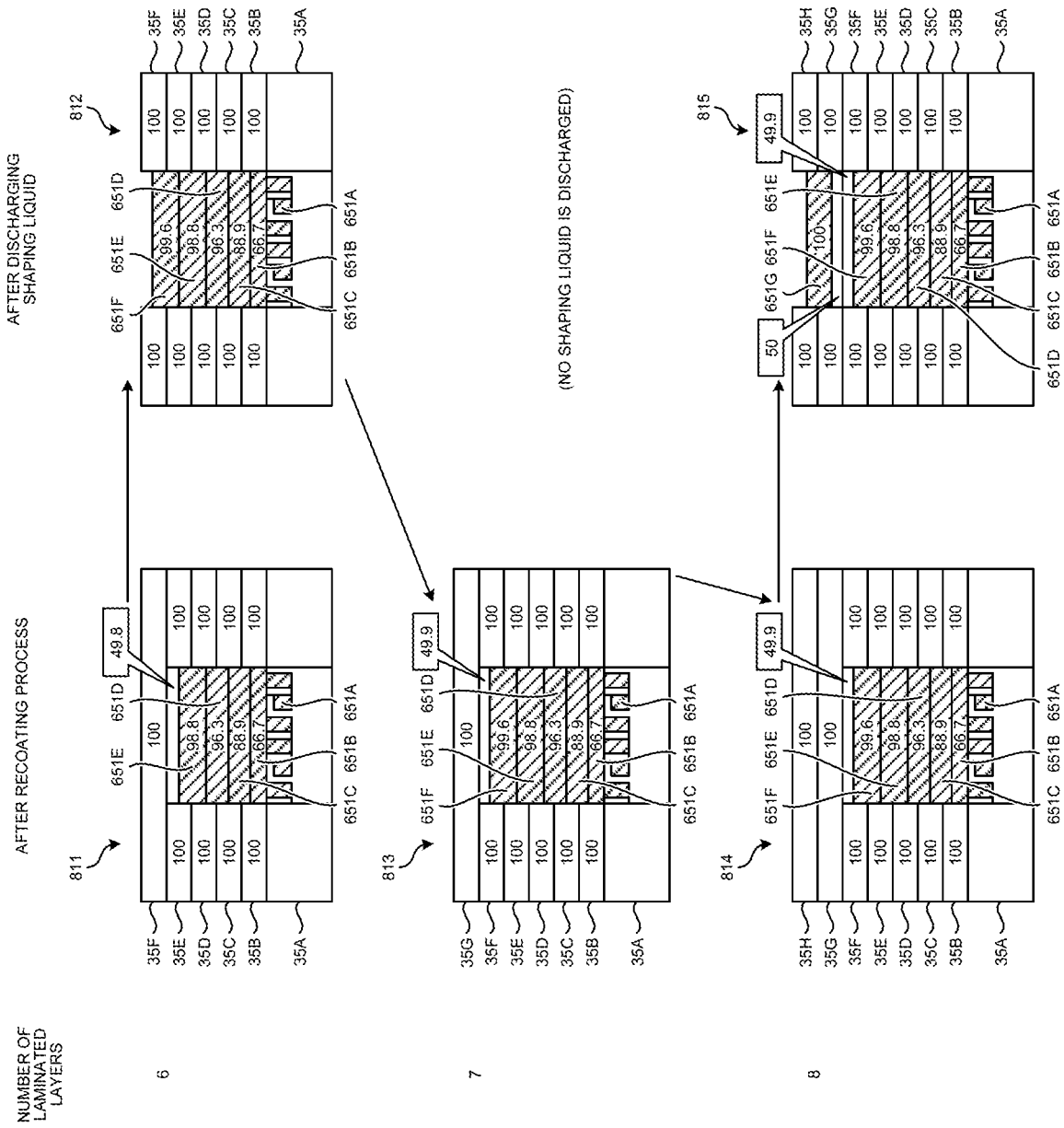
FIG. 21 is a second view for explaining the situation in which powder is provided prior to shaping the first layer.

FIG. 21 is a second view for explaining the situation in which powder is provided prior to shaping the first layer.

As illustrated in FIG. 20, a first state 801 illustrates the situation in which the first layer 35A sufficiently thicker than the thickness to of each single layer in the shaped object is laminated before dropping the shaping liquid 55 corresponding to the first layer. For example, in the present embodiment, the first layer 35A is approximately 300 μm thick.

In the following explanation, the designed value t for the thickness of a layer of the powder 27 that is laminated in the recoating process at each time is assumed to be 100 μm.

As explained above, in the initial layers of the shaped object (the first to the fourth layers in the example illustrated in FIG. 20), especially in the first layer, because the friction among the powder particles structuring the powder 27 is small since the shaping liquid 55 has not permeated, the quality of the shaped object is not stable because the powder particles easily move due to the liquid bridge force.

A second state 802 illustrates the situation after the shaping liquid 55 is discharged on the first layer 35A of the powder 27 recoating the previous layer.

In that situation, because no shaping liquid 55 at all is applied to the powder 27 structuring the first layer 35A, the friction among the powder particles is relatively small, and the powder 27 is therefore in a free state.

Accordingly, when the shaping liquid 55 is dropped onto the powder 27 in the free state, the thickness of the first permeation part 651A where the shaping liquid 55 has permeated in the first layer 35A becomes slightly smaller than the original thickness of the first layer 35A due to the effect of the gravity, and also, the powder 27 aggregates also in the horizontal direction due to the liquid bridge force, so that a gap is formed as illustrated in FIG. 20.

Further, positioned underneath the first permeation part 651A is a non-permeation part 651AA where the shaping liquid 55 has not permeated (the shaping liquid 55 has not spread).

Further, as for the powder 27 in the second layer and the layers thereafter, because the friction against the movement of the powder particles in the horizontal direction increases due to the impact from the shaping liquid 55 in the layer positioned underneath (e.g., the first layer for the second layer), the movement of the powder particles in the lamination direction (the vertical direction) affected by the gravity is dominant.

Further, as illustrated in a third state 803, the first layer 35A of the shaped object in that state is subsequently recoated with the second layer 35B.

The third state 803 indicates that the thickness of the second layer 35B of the powder 27 recoating the previous layer is equal to 100 μm.

A fourth state 804 illustrates the situation after the shaping liquid 55 is discharged on the second layer 35B of the powder 27. The thickness of a second permeation part 651B where the shaping liquid 55 has permeated in the second layer 35B is reduced. In the present example, the thickness is reduced from 100 μm to 66.7 μm.

Thereafter, as illustrated as a fifth state 805, the second layer 35B of the shaped object in this state is subsequently recoated with a third layer 35C.

The fifth state 805 also indicates that the thickness of the third layer 35C of the powder 27 recoating the previous layer is equal to 100 μm. With the recoating process at this time, the thickness reduction amount 33.3 μm in the second permeation part 651B is also supplemented with the powder 27, so that the total thickness of the second layer 35B and the third layer 35C is equal to 200 μm.

A sixth state 806 illustrates the situation after the shaping liquid 55 is discharged on the third layer 35C of the powder 27. The thickness of a third permeation part 651C where the shaping liquid 55 has permeated in the third layer 35C is reduced. In the present example, the thickness is reduced from 100 μm to 88.9 μm.

Further, as illustrated as a seventh state 807, the third layer 35C of the shaped object in this state is subsequently recoated with a fourth layer 35D.

The seventh state 807 also indicates that the thickness of the fourth layer 35D of the powder 27 recoating the previous layer is equal to 100 μm. With the recoating process at this time, the thickness reduction amount 44.5 μm in the third permeation part 651C is also supplemented with the powder 27, so that the total thickness of the second layer 35B to the fourth layer 35D is equal to 300 μm.

An eighth state 808 illustrates the situation after the shaping liquid 55 is discharged on the fourth layer 35D of the powder 27. The thickness of a fourth permeation part 651D where the shaping liquid 55 has permeated in the fourth layer 35D is reduced. In the present example, the thickness is reduced from 100 μm to 96.3 μm.

Further, as illustrated as a ninth state 809, the fourth layer 35D of the shaped object in this state is subsequently recoated with a fifth layer 35E.

The ninth state 809 also indicates that the thickness of the fifth layer 35E of the powder 27 recoating the previous layer is equal to 100 μm. With the recoating process at this time, the thickness reduction amount 48.1 μm in the fourth permeation part 651D is also supplemented with the powder 27, so that the total thickness of the second layer 35B to the fifth layer 35E is equal to 400 μm.

A tenth state 810 illustrates the situation after the shaping liquid 55 is discharged on the fifth layer 35E of the powder 27. The thickness of a fifth permeation part 651E where the shaping liquid 55 has permeated in the fifth layer 35E is reduced. In the present example, the thickness is reduced from 100 μm to 98.8 μm.

Further, as illustrated as an eleventh state 811, the fifth layer 35E of the shaped object in this state is subsequently recoated with a sixth layer 35F.

The eleventh state 811 also indicates that the thickness of the sixth layer 35F of the powder 27 recoating the previous layer is equal to 100 μm. With the recoating process at this time, the thickness reduction amount 49.8 μm in the fifth permeation part 651E is also supplemented with the powder 27, so that the total thickness of the second layer 35B to the sixth layer 35F is equal to 500 μm.

A twelfth state 812 illustrates the situation after the shaping liquid 55 is discharged on the sixth layer 35F of the powder 27. The thickness of a sixth permeation part 651F where the shaping liquid 55 has permeated in the sixth layer 35F is reduced. In the present example, the thickness is reduced from 100 μm to 99.6 μm.

Further, as illustrated as a thirteenth state 813, the sixth layer 35F of the shaped object in this state is subsequently recoated with a seventh layer 35G.

The seventh layer 35G is a layer having a special role in the present embodiment.

In this situation, until the thicknesses $t_n$ of the single layers in the shaped object gradually become close to the designed value, the amount of the powder 27 is small relative to the set amount of shaping liquid, and the shaping liquid 55 is dropped in surplus. Accordingly, as a result of the shaping liquid 55 permeating into unexpected sections in an anisotropic manner, degradation of the precision is caused.

To cope with this situation, according to the present embodiment, the seventh layer, which exhibits that the thicknesses $t_n$ of the single layers in the shaped object have certainly become close to the designed value gradually, is provided as a separation layer onto which purposefully no shaping liquid 55 is dropped, as illustrated in FIG. 21. Further, the shaped object up to the seventh layer is removed after the shaping, as a sacrificial layer serving as a sacrifice for obtaining a shaped object with desired precision.

Consequently, the thickness corresponding to the sacrificial layer is reflected into the data as a correction value for the design data, before the shaping is started.

The thirteenth state 813 also indicates that the thickness of the seventh layer 35G of the powder 27 recoating the previous layer is equal to 100 μm. During the recoating process, the thickness reduction amount 49.8 μm in the sixth permeation part 651F is also supplemented with the powder 27, so that the total thickness of the second layer 35B to the seventh layer 35G is equal to 600 μm.

Further, as illustrated as a fourteenth state 814, the seventh layer 35G of the shaped object in this state is subsequently recoated with an eighth layer 35H.

The fourteenth state 814 also indicates that the thickness of the eighth layer 35H of the powder 27 recoating the previous layer is equal to 100 μm. With the recoating process at this time, the total thickness of the second layer 35B to the eighth layer 35H is equal to 700 μm.

A fifteenth state 815 illustrates the situation after the shaping liquid 55 is discharged on the eighth layer 35H of the powder 27. As a result of the thickness of a seventh permeation part 651G where the shaping liquid 55 has permeated in the eighth layer 35H being reduced, the desired thickness of 100 μm is achieved.

Further, when the shaping liquid 55 is discharged onto the eighth layer 35H, although no shaping liquid 55 has been dropped on the seventh layer 35G, because the moisture on the inside of the powder 27 has increased due to the shaping liquid 55 applied to the layer positioned underneath thereof (i.e., the sixth layer 35F), the movement of the particles in the horizontal direction is not as significant as in the first layer 35A, and the sinking in the lamination direction is dominant.

As a result, the thickness of the permeation part 651G formed in the eighth layer 35H is substantially equal to the designed thickness t. The same is true with the ninth layer and the layers thereafter.

Figure 22:
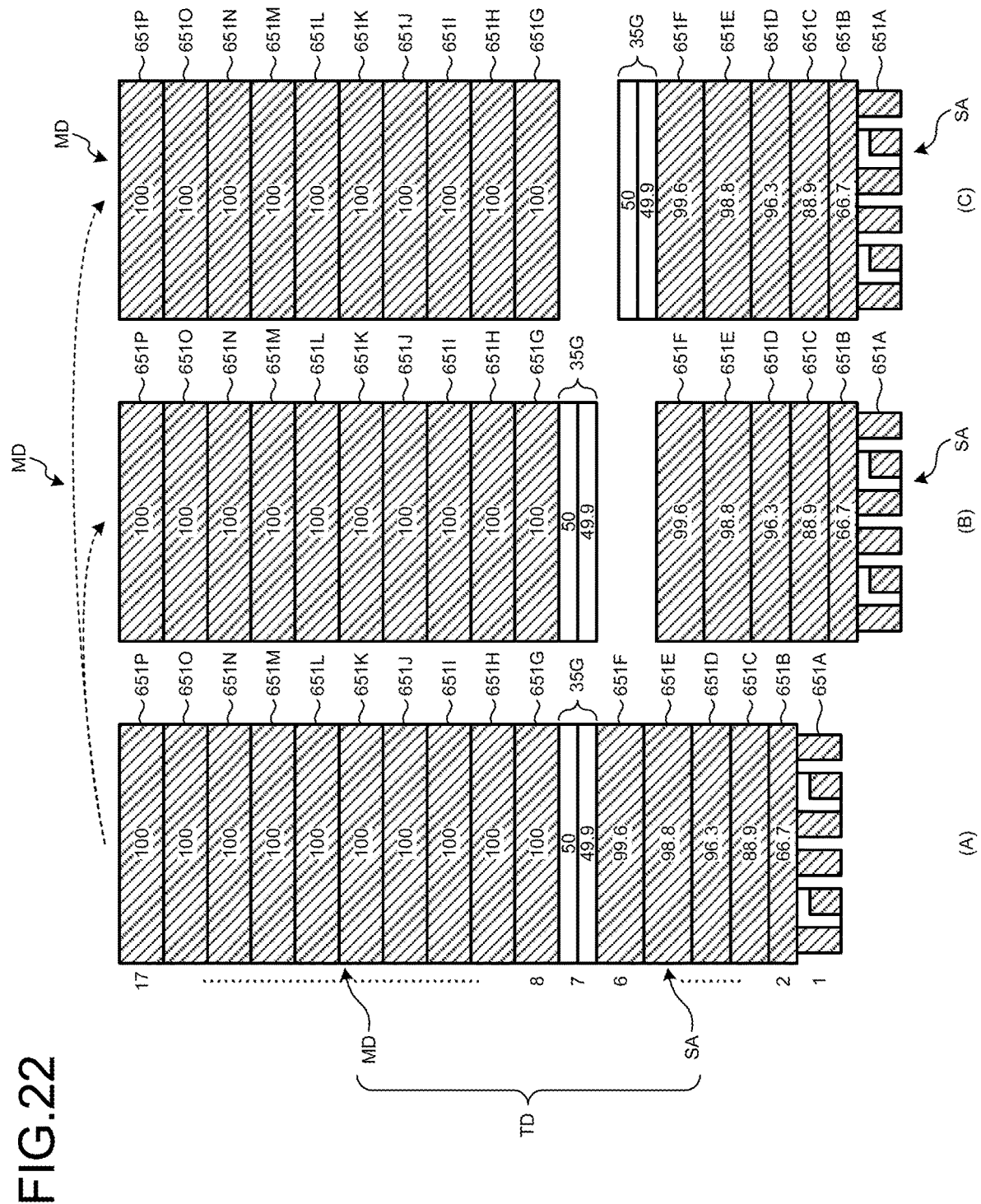
FIG. 22 is a view for explaining a completed three-dimensional shaped object.

FIG. 22 is a view for explaining a completed three-dimensional shaped object.

As illustrated at (A) in FIG. 22, a laminated member TD is formed in such a manner that a sacrifice member SA formed as a sacrificial layer and a three-dimensional shaped object MD are laminated together.

Further, for example, as illustrated at (B) in FIG. 22, the laminated member TD is separated into the sacrifice member SA and the three-dimensional shaped object MD by the seventh layer 35G formed as the separation layer, at the boundary between the sixth layer and the seventh layer.

As explained above, although no shaping liquid 55 is dropped on the seventh layer 35G, because the shaping liquid 55 dropped to the sections above seeps out little by little, it is considered that the powder 27 structuring the seventh layer 35G is bound together.

In the example illustrated at (B) in FIG. 22, because the shaped object is thicker by the thickness corresponding to a single layer (100 μm in the present embodiment), the design data should be corrected, in advance, with the amount corresponding to the thickness of the sacrificial layer to perform the shaping, and also, the shaping should be performed with a thickness set to be smaller by the amount corresponding to the single layer (100 μm in the present embodiment).

As illustrated at (C) in FIG. 22, depending on the physical properties of the materials and the processing conditions being used, the laminated member may be separated at the boundary between the seventh layer 35G and the permeation part 651G corresponding to the eighth layer 35H. In that situation, a correction should be made with the amount corresponding to the thickness of the sacrifice member SA serving as a sacrificial layer perform the shaping.

In that situation, as explained above, the number of layers required before the thicknesses to of the single layers gradually become close to the designed value t is dependent on the shrinking ratio k. Accordingly, it is also possible to calculate how many layers should be provided as the sacrificial layer, using Expression (1).

The explanation above is based on the situation where stainless steel powder is used as the powder 27. Next, a situation in which zirconia powder is used as the powder 27 will be explained.

Figure 23:
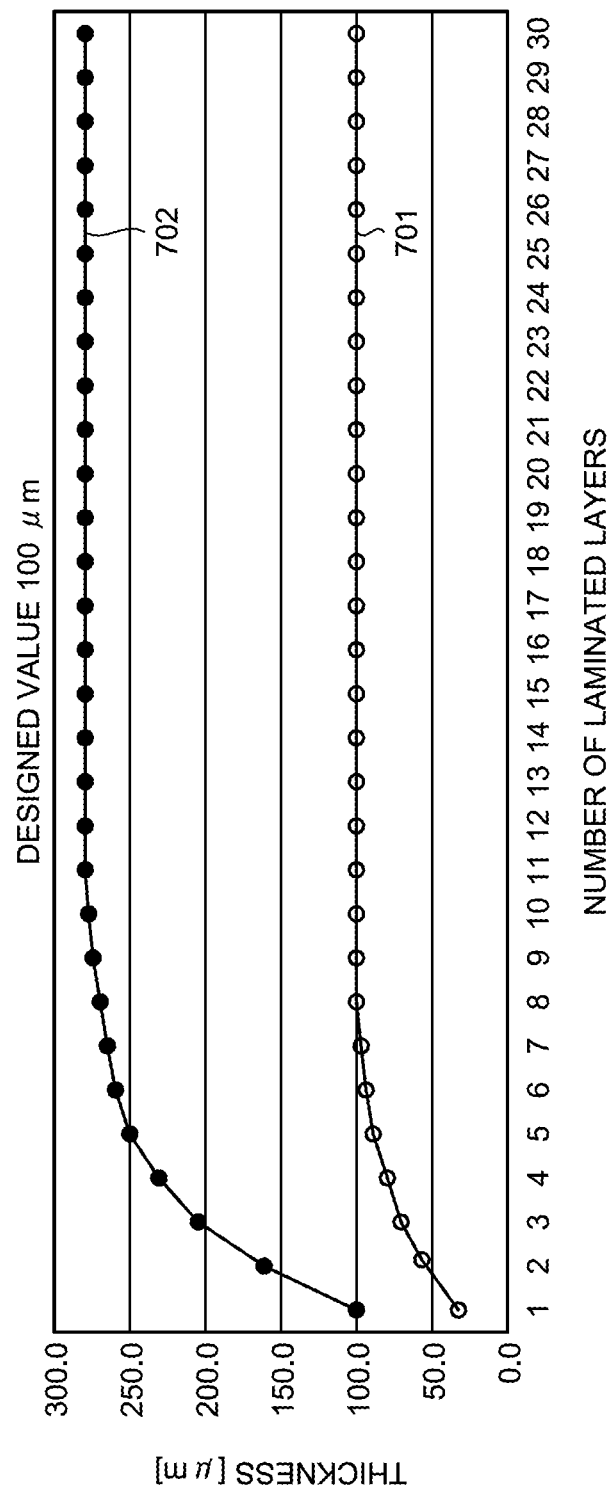
FIG. 23 is a graph for explaining a situation in which zirconia powder is used as the powder.

FIG. 23 is a graph for explaining the situation in which zirconia powder is used as the powder.

FIG. 23 illustrates a relationship between the number of laminated layers and the thicknesses of the permeation parts 651A to 651N and a relationship between the number of laminated layers and the thicknesses of the layers 35A to 35N increasing in actuality in the recoating processes.

Further, FIG. 24 is a diagram for explaining an example of the powder information corresponding to the situation where zirconia powder is used as the powder.

In the example illustrated in FIG. 24, the shaping data 510 is corrected so as to add the difference 180 μm to the designed thickness mt (=1,500 μm).

More specifically, when secondary particles (having an average particle diameter of 20 μm) obtained by spray-drying fine particles of zirconia (e.g., Yttria Stabilized Zirconia (YSZ) powder manufactured by Inframat Advanced Material, where the diameters of the primary particles are in the range of 20 nm to 30 nm) are used as a powder material, the powder density at the recoating stages is expressed as $\rho r=17\%$ ($\epsilon r=83\%$), whereas the density after the shaping liquid is dropped is expressed as $\rho i=47\%$ ($\epsilon i=53\%$). In this situation, on the assumption that the increase in the density is caused by changes in the thickness direction, the powder sinks by approximately 63.4 μm, so that the thickness is 35.7 μm in contrast to the designed value of 100 μm.

In other words, the shrinking ratio is calculated as k=0.357.

Similarly to the example with the stainless steel powder illustrated in FIG. 18, also in the present example with the zirconia powder, the thicknesses of the permeation parts 651A to 651N gradually become close to the designed value 100 μm for the thickness of the layer increasing in the recoating processes, as the number of laminated layers increases.

Incidentally, in the present example with zirconia, as illustrated in FIGS. 23 and 24, the thicknesses of the permeation parts 651A to 651N become substantially equal to 100 μm when the number of laminated layers has reached 12. Consequently, it is understood that, when the zirconia powder is used, the impact of the shrinkage of the powder 27 is constant in the twelfth layer and the layers thereafter.

As explained above, depending on the type of the powder 27, the characteristics of the asymptotes vary, and the impact of the shrinkage of the powder 27 also varies. Accordingly, by preparing a plurality of pieces of powder information 521 in correspondence with different types of powder 27 and by using an appropriate one of the pieces of powder information 521 in accordance with the powder 27 being used, it is possible to perform the correcting process appropriately.

The pieces of powder information 521A and 521B illustrated in FIGS. 19 and 24 are merely examples, and possible embodiments of the powder information 521 are not limited to these examples. For instance, the powder information 521 may be generated for each combination of the powder 27 (including various conditions such as the type of powder, the method for generating particles, the diameter of the powder particles, the diameter of the generated particles, and the like) and the shaping liquid 55. This arrangement is effective when a plurality of types of shaping liquid 55 is used with one type of powder 27. Further, the powder information 521 may be generated in association with environment information such as temperature, humidity, and the like. This arrangement is effective when the fluctuation of the shrinking ratio k (the density) of the powder 27 significantly changes depending on the environment.

As explained above, according to at least one aspect of the present embodiment, it is possible to obtain the sacrificial layer having the intended thickness by finding out, in advance, the shrinking ratio of the powder particles structuring the powder and incorporating the shrinking ratio into a program or the like.

In other words, according to at least one aspect of the present embodiment, it is possible to prevent harmful effects such as degradation of precision in shaping (planarity or flatness being degraded) caused by the shrinkage of the layers 35 caused by the permeation of the shaping liquid 55, and it is also possible to obtain a shaped object with high precision in shaping while keeping minimum shaping materials to be wasted and shaping time periods to be wasted.

As explained above, according to at least one aspect of the present embodiment, it is possible to improve the yield and the precision in shaping the three-dimensional shaped object, by preventing harmful effects caused by the shrinkage of the layers 35 caused by the permeation of the shaping liquid 55.

In the description above, to facilitate understanding, the thickness of the sacrificial layer is arranged to be equal to the thickness of the layers of the three-dimensional shaped object; however, it is possible to achieve the same advantageous effects by arranging the thickness of each of the layers laminated in the sacrificial layer to be thinner and performing the laminating processes until the thickness per layer becomes equal to a predetermined thickness. Further, with this arrangement, it is possible to suppress the amounts of powder and shaping liquid to be consumed for forming the sacrificial layer.

According to an embodiment, it is possible to improve the precision in shaping the three-dimensional shaped object.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three-dimensional shaping apparatus configured to generate a three-dimensional shaped object, the three-dimensional shaping apparatus comprising:
    a storage unit configured to store powder;
    a supplying unit configured to supply the powder to the storage unit to form a layer of the powder;
    a discharging unit configured to discharge a shaping liquid to solidify the powder onto the powder; and
    a controller configured to control the supplying unit and the discharging unit to laminate, based on shaping data and powder information, at least one sacrificial layer separable from at least one shaping layer corresponding to the three-dimensional shaped object in such a position that the at least one sacrificial layer is under the at least one shaping layer, the at least one sacrificial layer including a separation layer or the separation layer being included between the at least one sacrificial layer and the at least one shaping layer such that the shaping liquid is not discharged onto the separation layer while generating the three-dimensional shaped object, the shaping data indicating a shape of the three-dimensional shaped object and the powder information being stored in advance and indicating change in thickness of a layer of the powder caused by permeation of the shaping liquid.

2. The three-dimensional shaping apparatus according to claim 1, wherein the controller is configured to control the supplying unit and the discharging unit to laminate the at least one sacrificial layer in such a position that the at least one sacrificial layer is under the at least one shaping layer, until the thicknesses of a layer of the powder after discharging the shaping liquid is reduced to a set thickness.

3. The three-dimensional shaping apparatus according to claim 1, wherein the controller is configured to control the supplying unit and the discharging unit to laminate, between the at least one sacrificial layer and the at least one shaping layer, the separation layer such that the separation layer is one of (i) separated from the at least one shaping layer while being integrated with the at least one sacrificial layer, and (ii) separated from the at least one sacrificial layer while being integrated with the at least one shaping layer.

4. The three-dimensional shaping apparatus according to claim 3, wherein the controller is configured to prohibit the discharging unit from discharging the shaping liquid during when the at least one separation layer is laminated.

5. The three-dimensional shaping apparatus according to claim 3, wherein the controller is configured to control the supplying unit to supply the storage unit with the powder with a thickness sufficiently larger than a thickness corresponding to a single layer of the separation layer, prior to laminating the at least one sacrificial layer.

6. The three-dimensional shaping apparatus according to claim 1, wherein
    the shaping data includes a designed thickness of the three-dimensional shaped object,
    an actual thickness of the three-dimensional shaped object reduced by the permeation of the shaping liquid is calculated based on the powder information, and
    a difference between the designed thickness and the actual thickness is added to the designed thickness.

7. The three-dimensional shaping apparatus according to claim 1, wherein an actual thickness $t_n$ of an n-th layer of the at least one sacrificial layer is calculated using Expression (1):

$$t_n = k\left(nt - \sum_{j=1}^{n-1} t_j\right) \quad (1)$$

where t denotes a designed thickness of a single layer of the at least one sacrificial layer; n denotes a positive integer from 1 to m inclusive; and k denotes "a thickness of a single layer of the at least one sacrificial layer after the shaping liquid is discharged"/t.

8. A method for controlling a three-dimensional shaping apparatus to generate a three-dimensional shaped object, the three-dimensional shaping apparatus including a storage unit configured to store powder, a supplying unit configured to supply the powder to the storage unit to form a layer of the powder, and a discharging unit configured to discharge a shaping liquid to solidify the powder onto the powder, the method comprising:
    laminating, based on shaping data and powder information, at least one sacrificial layer separable from at least one shaping layer corresponding to the three-dimensional shaped object in such a position that the at least one sacrificial layer is under the at least one shaping layer, the at least one sacrificial layer including a separation layer or the separation layer being included between the at least one sacrificial layer and the at least one shaping layer such that the shaping liquid is not discharged onto the separation layer while generating the three-dimensional shaped object, the shaping data indicating a shape of the-three-dimensional shaped object and the powder information being stored in advance and indicating change in thickness of a layer of the powder caused by permeation of the shaping liquid.

9. A non-transitory recording medium including a computer program for controlling a three-dimensional shaping apparatus to generate a three-dimensional shaped object, the three-dimensional shaping apparatus including a storage unit configured to store powder, a supplying unit configured to supply the powder to the storage unit to form a layer of the powder, and a discharging unit configured to discharge a shaping liquid to solidify the powder onto the powder, the computer program causing a computer to control the three-dimensional shaping apparatus to:
    laminate, based on shaping data and powder information, at least one sacrificial layer separable from at least one shaping layer corresponding to the three-dimensional shaped object in such a position that the at least one sacrificial layer is under the at least one shaping layer, the at least one sacrificial layer including a separation layer or the separation layer being included between the at least one sacrificial layer and the at least one shaping layer such that the shaping liquid is not discharged onto the separation layer while generating the three-dimensional shaped object, the shaping data indicating a shape of the three-dimensional shaped object and the powder information being stored in advance and indicating change in thickness of a layer of the powder caused by permeation of the shaping liquid.

10. A three-dimensional shaping system comprising:
    an information processing terminal; and
    the three-dimensional shaping apparatus of claim 1, the three-dimensional shaping apparatus configured to receive the shaping data and the powder information from the information processing terminal, and to configured to control the supplying unit and the discharging unit to laminate the at least one sacrificial layer based on the shaping data and the powder information received from the information processing terminal.

11. The method of claim 8, wherein the laminating the at least one sacrificial layer comprises:
controlling the supplying unit and the discharging unit to laminate the at least one sacrificial layer in such a position that the at least one sacrificial layer is under the at least one shaping layer, until the thicknesses of a layer of the powder after discharging the shaping liquid is reduced to a set thickness.

12. The non-transitory recording medium of claim 9, wherein the computer program causes the computer to control the three-dimensional shaping apparatus to laminate the at least one sacrificial layer by controlling the supplying unit and the discharging unit to laminate the at least one sacrificial layer in such a position that the at least one sacrificial layer is under the at least one shaping layer, until the thicknesses of a layer of the powder after discharging the shaping liquid is reduced to a set thickness.

13. The method of claim 8, further comprising:
laminating, between the at least one sacrificial layer and the at least one shaping layer, the separation layer such that the separation layer is one of (i) separated from the at least one shaping layer while being integrated with the at least one sacrificial layer, and (ii) separated from the at least one sacrificial layer while being integrated with the at least one shaping layer; and
forming the at least one shaping layer on the separation layer.

14. The non-transitory recording medium of claim 9, wherein the computer program further causes the computer to control the three-dimensional shaping apparatus to,
laminate, between the at least one sacrificial layer and the at least one shaping layer, the separation layer such that the separation layer is one of (i) separated from the at least one shaping layer while being integrated with the at least one sacrificial layer, and (ii) separated from the at least one sacrificial layer while being integrated with the at least one shaping layer; and
form the at least one shaping layer on the separation layer.

15. The three-dimensional shaping apparatus according to claim 1, wherein the controller is configured to control the supplying unit and the discharging unit to laminate the at least one sacrificial layer in a position that the at least one sacrificial layer is under the at least one shaping layer, until the thicknesses of a layer of the powder after discharging the shaping liquid remains constant.

16. A three-dimensional shaping apparatus comprising:
a storage unit configured to store powder;
a supplying unit configured to supply the powder to the storage unit to form a layer of the powder;
a discharging unit configured to discharge shaping liquid to solidify the powder onto the powder; and
a controller configured to, based on shaping data indicating a shape of a three-dimensional shaped object, generate a control signal to control the supplying unit and the discharging unit to laminate, as at least one sacrificial layer separable from at least one shaping layer corresponding to the three-dimensional shaped object, layers until a thickness of a single layer onto which the shaping liquid has been ejected becomes a predetermined thickness while prohibiting the discharging unit from discharging the shaping liquid during lamination of at least one separation layer between the at least one sacrificial layer and the at least one shaping layer.

17. The three-dimensional shaping apparatus according to claim 16, wherein the controller is configured to generate the control signal that prohibits the discharging unit from discharging the shaping liquid during lamination of the at least one separation layer such that the separation layer is one of (i) separated from the at least one shaping layer while being integrated with the at least one sacrificial layer, and (ii) separated from the at least one sacrificial layer while being integrated with the at least one shaping layer.

18. The three-dimensional shaping apparatus according to claim 17, wherein the controller is configured to generate the control signal for causing the supplying unit to supply the storage unit with the powder with a thickness sufficiently larger than a thickness corresponding to a single layer of the at least one separation layer, prior to laminating the at least one sacrificial layer.

19. The three-dimensional shaping apparatus according to claim 16, wherein
the shaping data includes a designed thickness of the three-dimensional shaped object, and
an actual thickness of the three-dimensional shaped object reduced by permeation of the shaping liquid is calculated, and
a difference between the designed thickness and the actual thickness is added to the designed thickness.

* * * * *